(12) United States Patent
Dolgikh et al.

(10) Patent No.: US 12,081,275 B2
(45) Date of Patent: Sep. 3, 2024

(54) SIGNAL PROCESSING METHOD AND APPARATUS, AND COHERENT RECEIVER

(71) Applicant: HUAWEI TECHNOLOGIES CO., LTD., Shenzhen (CN)

(72) Inventors: Dmitry Anatolievich Dolgikh, Moscow (RU); Wanyang Wu, Moscow (RU); Plotnikov Pavel, Moscow (RU)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/071,402

(22) Filed: Nov. 29, 2022

(65) Prior Publication Data

US 2023/0163857 A1 May 25, 2023

Related U.S. Application Data

(63) Continuation of application No. PCT/CN2021/094742, filed on May 20, 2021.

(30) Foreign Application Priority Data

May 29, 2020 (RU) .......................... RU2020117812

(51) Int. Cl.
*H04B 10/00* (2013.01)
*H04B 10/079* (2013.01)
(Continued)

(52) U.S. Cl.
CPC ... *H04B 10/6162* (2013.01); *H04B 10/07951* (2013.01); *H04B 10/516* (2013.01)

(58) Field of Classification Search
CPC .............. H04B 10/616; H04B 10/6161; H04B 10/6162
See application file for complete search history.

(56) References Cited

U.S. PATENT DOCUMENTS 4,788,654 A    11/1988   Duhamel et al.
5,179,529 A *   1/1993   Nowakowski ........ G06F 17/144
                                                   708/404

(Continued)

FOREIGN PATENT DOCUMENTS

CN    103870438 A    6/2014
CN    106685663 A    5/2017
(Continued)

*Primary Examiner* — Daniel G Dobson
(74) *Attorney, Agent, or Firm* — Leydig, Voit & Mayer, Ltd.

(57) ABSTRACT

This application provides a signal processing method and apparatus, and a coherent receiver. The signal processing method includes: obtaining P real-number signals; performing at least number theoretic transform NTT processing on the P real-number signals to obtain P transform-domain first real-number signals; performing at least clock recovery on the P transform-domain first real-number signals to obtain P transform-domain second real-number signals; performing at least polarization compensation and inverse number theoretic transform INTT processing on the P transform-domain second real-number signals to obtain m time-domain complex-number signals X and m time-domain complex-number signals Y; and performing phase recovery and decoding on the m time-domain complex-number signals X and the m time-domain complex-number signals Y to obtain bit signals.

20 Claims, 17 Drawing Sheets

(51) Int. Cl.
*H04B 10/516* (2013.01)
*H04B 10/61* (2013.01)
*H04J 14/00* (2006.01)

(56) References Cited

U.S. PATENT DOCUMENTS

| | | | |
|---|---|---|---|
| 6,625,629 B1 | 9/2003 | Garcia | |
| 2011/0243573 A1* | 10/2011 | Roberts | H04B 10/2572 398/152 |
| 2019/0022412 A1 | 1/2019 | Vertatschitsch et al. | |

FOREIGN PATENT DOCUMENTS

| | | | | |
|---|---|---|---|---|
| JP | H02292667 A | 12/1990 | | |
| JP | 2017038103 A | 2/2017 | | |
| KR | 101952547 B1 | 2/2019 | | |
| WO | WO-2011100867 A1 * | 8/2011 | | H04L 7/027 |
| WO | 2012105714 A1 | 8/2012 | | |
| WO | 2016103631 A1 | 6/2016 | | |

* cited by examiner

SIGNAL PROCESSING METHOD AND APPARATUS, AND COHERENT RECEIVER

CROSS-REFERENCE TO RELATED APPLICATIONS

This application is a continuation of International Application No. PCT/CN2021/094742, filed on May 20, 2021, which claims priority to Russian Patent Application No. RU2020117812, filed on May 29, 2020. The disclosures of the aforementioned applications are hereby incorporated by reference in their entireties.

TECHNICAL FIELD

The present disclosure relates to the optical communications field. Embodiments of the present disclosure provide a signal processing method and apparatus, and a coherent receiver.

BACKGROUND

Performance of a high-capacity optical communications system may deteriorate due to optical fiber attenuation, optical fiber chromatic dispersion, polarization mode chromatic dispersion, laser phase noise, optical fiber nonlinearity, or the like. A currently provided polarization multiplexing coherent receiver can effectively compensate for the foregoing deterioration factors in electrical domain during an electrical signal processing procedure.

During the electrical signal processing procedure of the existing polarization multiplexing coherent receiver, to implement the foregoing effective compensation in electrical domain, convolution of a time-domain signal and an inverse function of a channel response is implemented based on Fourier transform. Therefore, a fast Fourier transform (FFT) module and an inverse fast Fourier transform (IFFT) module need to be introduced into a structure of the polarization multiplexing coherent receiver. However, the Fourier transform has high complexity and low precision. As a result, the electrical signal processing procedure is highly complex, and accuracy of a recovered signal is low. Therefore, how to improve performance of a polarization multiplexing coherent receiver in processing an electrical signal becomes an urgent problem to be resolved.

SUMMARY

Embodiments of the present disclosure provide a signal processing method and apparatus, and a coherent receiver, to improve signal processing performance.

According to a first aspect, a signal processing method is provided. The signal processing method may be performed by a coherent receiver, or may be performed by a chip or a circuit disposed in a coherent receiver. This is not limited in the present disclosure.

The signal processing method includes:
first, obtaining P real-number signals, where the P real-number signals include P real-number signals obtained through analog-to-digital conversion or other P real-number signals that require digital signal processing, and this is not limited in the present disclosure;
then, performing at least number theoretic transform (NTT) processing on the P real-number signals to obtain P transform-domain first real-number signals;
then, performing at least clock recovery on the P transform-domain first real-number signals to obtain P transform-domain second real-number signals; and
then, performing at least polarization compensation and inverse number theoretic transform (INTT) processing on the P transform-domain second real-number signals to obtain m time-domain complex-number signals X and m time-domain complex-number signals Y, where m and P are positive integers.

Further, if INTT and combination processing is first performed and then polarization compensation processing is performed, in the signal processing method provided in the present disclosure, phase recovery and decoding may be performed on m time-domain complex-number signals X and m time-domain complex-number signals Y that are obtained through polarization compensation, to obtain bit signals.

It should be understood that if the INTT and combination processing is first performed and then the polarization compensation processing is performed, the polarization compensation processing is performed based on a time-domain signal obtained through INTT processing. Specifically, a capability of resisting a loop delay can be enhanced by performing polarization compensation processing in time domain.

Alternatively, if polarization compensation processing is first performed and then INTT and combination processing is performed, in the signal processing method provided in the present disclosure, phase recovery and decoding may be performed on m time-domain complex-number signals X in a first polarization direction and m time-domain complex-number signals Y in a second polarization direction that are obtained through combination, to obtain bit signals, so as to implement signal recovery.

It should be understood that if the polarization compensation processing is first performed and then the INTT and combination processing is performed, the polarization compensation processing is performed based on a transform-domain signal. Specifically, polarization equalization impairment compensation is performed in transform domain, and multiplication is used to replace convolution, so that power consumption can be reduced.

In the signal processing method provided in the present disclosure, signals in two polarization directions are obtained through analog-to-digital conversion, and the signals in the two polarization directions are input to a receiver digital signal processing Rx DSP apparatus. During a processing procedure of the Rx DSP, number theoretic transform NTT and inverse number theoretic transform INTT processing is used to replace fast Fourier transform FFT and inverse fast Fourier transform IFFT processing, to avoid high complexity and low accuracy caused by the FFT and IFFT processing, thereby improving signal processing performance.

With reference to the first aspect, in some implementations of the first aspect, the performing at least number theoretic transform NTT processing on the P real-number signals to obtain P transform-domain first real-number signals includes: performing NTT processing on the P real-number signals to obtain the P transform-domain first real-number signals; or
performing digital back propagation DBP processing on the P real-number signals to obtain P time-domain tenth real-number signals, and separately performing NTT processing on the P time-domain tenth real-number signals to obtain the P transform-domain first real-number signals.

If the P real-number signals undergo DBP processing, a DBP module is used to implement nonlinear-effect compensation, to increase a signal transmission distance.

In the signal processing method provided in the present disclosure, the P transform-domain first real-number signals may be obtained by inputting the P real-number signals to an NTT module and performing NTT processing; or the P transform-domain first real-number signals may be obtained by first inputting the P real-number signals to the DBP module and performing DBP processing, and then performing NTT processing. Different manners of obtaining the P transform-domain first real-number signals are provided, so that a structural design of the Rx DSP apparatus is more flexible.

With reference to the first aspect, in some implementations of the first aspect, when the P real-number signals do not undergo DBP processing, chromatic dispersion compensation needs to be performed when the P transform-domain second real-number signals are obtained based on the P transform-domain first real-number signals. To be specific, the performing at least clock recovery on the P transform-domain first real-number signals to obtain P transform-domain second real-number signals includes: performing chromatic dispersion compensation on the P transform-domain first real-number signals to obtain P transform-domain third real-number signals; and performing clock recovery on the P transform-domain third real-number signals to obtain the P transform-domain second real-number signals.

Alternatively, when the P real-number signals undergo DBP processing, because the DBP module has a chromatic dispersion compensation function, no additional chromatic dispersion compensation needs to be performed when the P transform-domain second real-number signals are obtained based on the P transform-domain first real-number signals. To be specific, the performing at least clock recovery on the P transform-domain first real-number signals to obtain P transform-domain second real-number signals includes: performing chromatic dispersion compensation on the P transform-domain first real-number signals to obtain the P transform-domain second real-number signals.

With reference to the first aspect, in some implementations of the first aspect, the P real-number signals include an in-phase real-number signal $I'''_x$ and a quadrature real-number signal $Q'''_x$ in the first polarization direction, and an in-phase real-number signal $I'''_y$ and a quadrature real-number signal $Q'''_y$ in the second polarization direction. In the foregoing case in which additional chromatic dispersion compensation is required, a chromatic dispersion compensation process includes: performing NTT processing on a chromatic dispersion impulse response $I_h(t)$ corresponding to an in-phase real-number signal and a chromatic dispersion impulse response $Q_h(t)$ corresponding to a quadrature real-number signal, to obtain a transform-domain chromatic dispersion equalization function $I_h(w)$ corresponding to the in-phase real-number signal and a transform-domain chromatic dispersion equalization function $Q_h(w)$ corresponding to the quadrature real-number signal.

After $I_h(w)$ and $Q_h(w)$ are obtained, 2×m transform-domain third real-number signals that are in the P transform-domain third real-number signals and that are in the first polarization direction can be determined based on $I_h(w)$, $Q_h(w)$, and an in-phase real-number signal and a quadrature real-number signal that are in the P transform-domain first real-number signals and that are in the first polarization direction, and 2×m transform-domain third real-number signals that are in the P transform-domain third real-number signals and that are in the second polarization direction can be determined based on $I_h(w)$, $Q_h(w)$, and an in-phase real-number signal and a quadrature real-number signal that are in the P transform-domain first real-number signals and that are in the second polarization direction, so as to complete chromatic dispersion compensation.

With reference to the first aspect, in some implementations of the first aspect, the transform-domain third real-number signals obtained through chromatic dispersion compensation and the transform-domain first real-number signals meet the following requirements:

$$I'_x(w) = I_x(w) \cdot I_h(w) - Q_x(w) \cdot Q_h(w);$$

$$Q'_x(w) = Q_x(w) \cdot I_h(w) + I_x(w) \cdot Q_h(w);$$

$$I'_y(w) = I_y(w) \cdot I_h(w) - Q_y(w) \cdot Q_h(w); \text{ and}$$

$$Q'_y(w) = Q_y(w) \cdot I_h(w) + I_y(w) \cdot Q_h(w), \text{ where}$$

$I_x(w)$ represents an in-phase real-number signal that is in the transform-domain first real-number signals and that is in the first polarization direction, $Q_x(w)$ represents a quadrature real-number signal that is in the transform-domain first real-number signals and that is in the first polarization direction, $I_y(w)$ represents an in-phase real-number signal that is in the transform-domain first real-number signals and that is in the second polarization direction, $Q_y(w)$ represents a quadrature real-number signal that is in the transform-domain first real-number signals and that is in the second polarization direction, $I'_x(w)$ represents an in-phase real-number signal that is in the transform-domain third real-number signals and that is in the first polarization direction, $Q'_x(w)$ represents a quadrature real-number signal that is in the transform-domain third real-number signals and that is in the first polarization direction, $I'_y(w)$ represents an in-phase real-number signal that is in the transform-domain third real-number signals and that is in the second polarization direction, and $Q'_y(w)$ represents a quadrature real-number signal that is in the transform-domain third real-number signals and that is in the second polarization direction.

Specifically, when m is equal to 1, the determining 2*m transform-domain third real-number signals that are in the P transform-domain third real-number signals and that are in the first polarization direction based on $I_h(w)$, $Q_h(w)$, and an in-phase real-number signal and a quadrature real-number signal that are in the P transform-domain first real-number signals and that are in the first polarization direction includes:

$$Ix\_3 = Ix\_1 \cdot I_h(w) - Qx\_1 \cdot Q_h(w); \; Qx\_3 = Qx\_1 \cdot I_h(w) + Ix\_1 \cdot Q_h(w), \text{ where}$$

Ix_3 represents a transform-domain in-phase third real-number signal in the first polarization direction, Ix_1 represents an in-phase real-number signal that is in the P transform-domain first real-number signals and that is in the first polarization direction, Qx_3 represents a transform-domain quadrature third real-number signal in the first polarization direction, and Qx_1 represents a quadrature real-number signal that is in the P transform-domain first real-number signals and that is in the first polarization direction; and the determining 2×m transform-domain third real-number signals that are in the P transform-domain third real-number signals and that are in the second polarization direction based on $I_h(w)$, $Q_h(w)$, and an in-phase real-number signal and a quadrature real-number signal that are in the P transform-domain first real-number signals and that are in the second polarization direction includes:

$$Iy\_3 = Iy\_1 \cdot I_h(w) - Qy\_1 \cdot Q_h(w); \quad Qy\_3 = Qy\_1 \cdot I_h(w) + Iy\_1 \cdot Q_h(w), \text{ where}$$

Iy_3 represents a transform-domain in-phase third real-number signal in the second polarization direction, Iy_1 represents an in-phase real-number signal that is in the P transform-domain first real-number signals and that is in the second polarization direction, Qy_3 represents a transform-domain in-phase third real-number signal in the second polarization direction, and Qy_1 represents an in-phase real-number signal that is in the P transform-domain first real-number signals and that is in the second polarization direction.

With reference to the first aspect, in some implementations of the first aspect, the DBP processing specifically includes: performing NTT processing on the P real-number signals to obtain P transform-domain fourth real-number signals; performing, in transform domain, chromatic dispersion compensation on the P transform-domain fourth real-number signals to obtain P transform-domain fifth real-number signals; performing INTT processing on the P transform-domain fifth real-number signals to obtain P time-domain ninth real-number signals; and performing nonlinear compensation on the P time-domain ninth real-number signals to obtain the P time-domain tenth real-number signals.

With reference to the first aspect, in some implementations of the first aspect, polarization compensation may be first performed and then INTT processing is performed, to obtain P time-domain seventh real-number signals.

Specifically, polarization compensation is performed on the P transform-domain second real-number signals to obtain P transform-domain sixth real-number signals; and INTT processing is performed on the P transform-domain sixth real-number signals to obtain the P time-domain seventh real-number signals. Equalization and depolarization are performed on 2×m transform-domain second real-number signals that are in the P transform-domain second real-number signals and that are in the first polarization direction to obtain 2×m transform-domain sixth real-number signals that are in the P transform-domain sixth real-number signals and that are in the first polarization direction. Equalization and depolarization are performed on 2×m transform-domain second real-number signals that are in the P transform-domain second real-number signals and that are in the second polarization direction to obtain 2×m transform-domain sixth real-number signals that are in the P transform-domain sixth real-number signals and that are in the second polarization direction.

Then, the P time-domain seventh real-number signals obtained through INTT processing are combined. 2×m time-domain seventh real-number signals that are in the P time-domain seventh real-number signals and that are in the first polarization direction are combined into m time-domain complex-number signals X in the first polarization direction. 2×m time-domain seventh real-number signals that are in the P time-domain seventh real-number signals and that are in the second polarization direction are combined into m time-domain complex-number signals Y in the second polarization direction.

With reference to the first aspect, in some implementations of the first aspect, INTT processing may be first performed and then polarization compensation is performed, to obtain a time-domain complex-number signal X and a time-domain complex-number signal Y that have undergone the polarization compensation.

Specifically, INTT processing is performed on the P transform-domain second real-number signals to obtain P time-domain eighth real-number signals. 2×m time-domain eighth real-number signals that are in the P time-domain eighth real-number signals and that are in the first polarization direction are combined into m time-domain complex-number signals X in the first polarization direction. 2×m time-domain eighth real-number signals that are in the P time-domain eighth real-number signals and that are in the second polarization direction are combined into m time-domain complex-number signals Y in the second polarization direction. Time-domain polarization compensation is performed on the m time-domain complex-number signals X in the first polarization direction and the m time-domain complex-number signals Y in the second polarization direction to obtain m time-domain complex-number signals X and m time-domain complex-number signals Y that have undergone the polarization compensation.

With reference to the first aspect, in some implementations of the first aspect, the P real-number signals include 4×m real-number signals in m transmission modes. m may be a value equal to 1 or greater than 1. P and m satisfy P=4×m. When m is equal to 1, it may be understood as single-mode transmission; or when m is greater than 1, it may be understood as multi-mode transmission.

According to a second aspect, a signal processing apparatus is provided, including a processor. The processor is coupled to a memory, and may be configured to execute an instruction in the memory, to implement the method in any one of the first aspect or the possible implementations of the first aspect.

Optionally, the apparatus further includes a communications interface, and the processor is coupled to the communications interface.

In an implementation, the apparatus is a digital signal processor. When the apparatus is a digital signal processor, the communications interface may be a transceiver or an input/output interface.

In another implementation, the apparatus is a chip configured in a digital signal processor. When the apparatus is a chip configured in a digital signal processor, the communications interface may be an input/output interface.

In another implementation, the apparatus is a chip or a chip system.

Optionally, the transceiver may be a transceiver circuit.

Optionally, the input/output interface may be an input/output circuit.

Specifically, the signal processing apparatus includes:
- a first number theoretic transform NTT module, configured to perform NTT processing on P input signals to obtain P transform-domain first real-number signals;
- a clock recovery module, configured to perform clock recovery on the P transform-domain first real-number signals or P transform-domain first real-number signals obtained through chromatic dispersion compensation, to obtain P transform-domain second real-number signals;
- a polarization compensation module and a first inverse number theoretic transform INTT module, configured to process the P transform-domain second real-number signals to obtain m time-domain complex-number signals X and m time-domain complex-number signals Y; and
- a phase recovery module and a decoding module, configured to perform phase recovery and decoding on the time-domain complex-number signal X and the time-domain complex-number signal Y to obtain bit signals, where m and P are positive integers.

With reference to the second aspect, in some implementations of the second aspect, the P input signals include P real-number signals, and that the first number theoretic transform NTT module is configured to perform NTT processing on P input signals to obtain P transform-domain first real-number signals includes: the first number theoretic transform NTT module is configured to perform number theoretic transform on the P real-number signals to obtain the P transform-domain first real-number signals.

For example, the P real-number signals include $4 \times m$ real-number signals in m transmission modes. m may be a value equal to 1 or greater than 1. P and m satisfy $P=4 \times m$. When m is equal to 1, it may be understood as single-mode transmission; or when m is greater than 1, it may be understood as multi-mode transmission.

With reference to the second aspect, in some implementations of the second aspect, the apparatus further includes a first chromatic dispersion compensation module, configured to perform chromatic dispersion compensation on the P transform-domain first real-number signals to obtain P transform-domain third real-number signals; and the clock recovery module is configured to perform clock recovery on the P transform-domain third real-number signals to obtain the P transform-domain second real-number signals.

With reference to the second aspect, in some implementations of the second aspect, that the first chromatic dispersion compensation module is configured to perform chromatic dispersion compensation on the P transform-domain first real-number signals to obtain P transform-domain third real-number signals includes:

the first chromatic dispersion compensation module is configured to determine m transform-domain third real-number signals that are in the P transform-domain third real-number signals and that are in the first polarization direction based on a transform-domain chromatic dispersion equalization function $I_h(w)$ corresponding to an in-phase real-number signal, a transform-domain chromatic dispersion equalization function $Q_h(w)$ corresponding to a quadrature real-number signal, and an in-phase real-number signal and a quadrature real-number signal that are in the P transform-domain first real-number signals and that are in the first polarization direction; and the first chromatic dispersion compensation module is configured to determine $2 \times m$ transform-domain third real-number signals that are in the P transform-domain third real-number signals and that are in the second polarization direction based on $I_h(w)$, $Q_h(w)$, and an in-phase real-number signal and a quadrature real-number signal that are in the P transform-domain first real-number signals and that are in the second polarization direction, where $I_h(w)$ and $Q_h(w)$ are obtained by performing NTT processing on a chromatic dispersion impulse response W0 corresponding to the in-phase real-number signal and a chromatic dispersion impulse response $Q_h(t)$ corresponding to the quadrature real-number signal, respectively.

With reference to the second aspect, in some implementations of the second aspect, the transform-domain third real-number signals obtained through chromatic dispersion compensation and the transform-domain first real-number signals meet the following requirements:

$$I'_x(w)=I_x(w) \cdot I_h(w)-Q_x(w) \cdot Q_h(w);$$

$$Q'_x(w)=Q_x(w) \cdot I_h(w)+I_x(w) \cdot Q_h(w);$$

$$I'_y(w)=I_y(w) \cdot I_h(w)-Q_y(w) \cdot Q_h(w); \text{ and}$$

$$Q'_y(w)=Q_y(w) \cdot I_h(w)+I_y(w) \cdot Q_h(w), \text{ where}$$

$I_x(w)$ represents an in-phase real-number signal that is in the transform-domain first real-number signals and that is in the first polarization direction, $Q_x(w)$ represents a quadrature real-number signal that is in the transform-domain first real-number signals and that is in the first polarization direction, $I_y(w)$ represents an in-phase real-number signal that is in the transform-domain first real-number signals and that is in the second polarization direction, $Q_y(w)$ represents a quadrature real-number signal that is in the transform-domain first real-number signals and that is in the second polarization direction, $I'_x(w)$ represents an in-phase real-number signal that is in the transform-domain third real-number signals and that is in the first polarization direction, $Q'_x(w)$ represents a quadrature real-number signal that is in the transform-domain third real-number signals and that is in the first polarization direction, $I'_y(w)$ represents an in-phase real-number signal that is in the transform-domain third real-number signals and that is in the second polarization direction, and $Q'_y(w)$ represents a quadrature real-number signal that is in the transform-domain third real-number signals and that is in the second polarization direction.

With reference to the second aspect, in some implementations of the second aspect, the first chromatic dispersion compensation module includes a third NTT module, a combination module, and a multiplication module. The third NTT module is configured to perform NTT processing on a time-domain chromatic dispersion impulse response to obtain a chromatic dispersion equalization function, and perform NTT processing on the P transform-domain first real-number signals. The multiplication module is configured to multiply the chromatic dispersion equalization function by the P transform-domain first real-number signals obtained through NTT processing. The combination module is configured to combine signals obtained through processing by the multiplication module.

With reference to the second aspect, in some implementations of the second aspect, the P input signals include P time-domain tenth real-number signals; and the apparatus further includes a digital back propagation DBP module, configured to perform DBP processing on P digital signals to obtain the P time-domain tenth real-number signals.

When the apparatus includes the DBP module, the apparatus uses the DBP module to implement nonlinear-effect compensation on a basis of a linear impairment, to increase a signal transmission distance.

With reference to the second aspect, in some implementations of the second aspect, the DBP module sequentially includes:

a second NTT module, a second chromatic dispersion compensation module, a second INTT module, and a nonlinear compensation module, where that the DBP module is configured to perform DBP processing on P digital signals to obtain the P time-domain tenth real-number signals includes:

the second NTT module is configured to perform NTT processing on the P digital signals to obtain P transform-domain fourth real-number signals;

the second chromatic dispersion compensation module is configured to perform, in transform domain, chromatic dispersion compensation on the P transform-domain fourth real-number signals to obtain P transform-domain fifth real-number signals;

the second INTT module is configured to perform INTT processing on the P transform-domain fifth real-number signals to obtain P time-domain ninth real-number signals; and the nonlinear compensation module is configured to perform nonlinear compensation on the P time-domain ninth real-number signals to obtain the P time-domain tenth real-number signals.

With reference to the second aspect, in some implementations of the second aspect, the clock recovery module is configured to perform clock recovery on the P transform-domain first real-number signals to obtain the P transform-domain second real-number signals.

With reference to the second aspect, in some implementations of the second aspect, the apparatus further includes:
a combination module, where
the polarization compensation module is configured to perform polarization compensation on the P transform-domain second real-number signals to obtain P transform-domain sixth real-number signals;
the first inverse number theoretic transform INTT module is configured to perform INTT processing on the P transform-domain sixth real-number signals to obtain P time-domain seventh real-number signals; and
the combination module is configured to combine every two of 2×m time-domain seventh real-number signals that are in the P time-domain seventh real-number signals and that are in the first polarization direction to obtain m time-domain complex-number signals X in the first polarization direction; and
combine every two of 2×m time-domain seventh real-number signals that are in the P time-domain seventh real-number signals and that are in the second polarization direction to obtain m time-domain complex-number signals Y in the second polarization direction.

For example, the polarization compensation module includes a first butterfly filter and a second butterfly filter.

The first butterfly filter is configured to perform equalization and depolarization on 2×m transform-domain second real-number signals that are in the P transform-domain second real-number signals and that are in the first polarization direction to obtain 2×m transform-domain sixth real-number signals that are in the P transform-domain sixth real-number signals and that are in the first polarization direction.

The second butterfly filter is configured to perform equalization and depolarization on 2×m transform-domain second real-number signals that are in the P transform-domain second real-number signals and that are in the second polarization direction to obtain 2×m transform-domain sixth real-number signals that are in the P transform-domain sixth real-number signals and that are in the second polarization direction.

Specifically, during a signal processing procedure, when the apparatus first performs polarization compensation processing based on the polarization compensation module and then performs INTT processing based on the first INTT module, the polarization compensation processing is performed based on a transform-domain signal. Polarization equalization impairment compensation is performed in transform domain, and multiplication is used to replace convolution, so that power consumption can be reduced.

Alternatively, the apparatus further includes a combination module, where the first inverse number theoretic transform INTT module is configured to perform INTT processing on the P transform-domain second real-number signals to obtain P time-domain eighth real-number signals;

the combination module is configured to combine every two of 2×m time-domain eighth real-number signals that are in the P time-domain eighth real-number signals and that are in the first polarization direction to obtain m time-domain complex-number signals X in the first polarization direction; and combine every two of 2×m time-domain eighth real-number signals that are in the P time-domain eighth real-number signals and that are in the second polarization direction to obtain m time-domain complex-number signals Y in the second polarization direction; and the polarization compensation module is configured to perform time-domain polarization compensation on the m complex-number signals X and the m complex-number signals Y.

For example, the polarization compensation module includes a third butterfly filter. The third butterfly filter is configured to perform time-domain polarization compensation on the m time-domain complex-number signals X in the first polarization direction and the m time-domain complex-number signals Y in the second polarization direction to obtain m time-domain complex-number signals X and m time-domain complex-number signals Y that have undergone the polarization compensation.

Specifically, during a signal processing procedure, when the apparatus first performs INTT processing based on the first INTT module and then performs polarization compensation processing based on the polarization compensation module, the polarization compensation processing is performed based on a time-domain signal obtained through INTT processing. A capability of resisting a loop delay can be enhanced by performing polarization compensation processing in time domain.

According to a third aspect, a coherent receiver is provided. The coherent receiver includes the signal processing apparatus in any one of the second aspect or the possible implementations of the second aspect.

Further, the coherent receiver further includes a polarization beam splitter, a frequency mixer, a photoelectric detector, and an analog-to-digital converter. The polarization beam splitter is configured to obtain signals in two polarization directions. The frequency mixer is configured to perform frequency mixing processing on signals in a same polarization direction. The photoelectric detector is configured to convert strength of an optical signal into strength of an electrical signal. The analog-to-digital converter is configured to perform analog-signal-to-digital-signal conversion on a signal.

According to a fourth aspect, a chip is provided. The chip includes a communications interface, a memory, and a processor. The memory is configured to store a computer program. The processor is configured to read and execute the computer program stored in the memory, so that the chip implements the signal processing method in any one of the first aspect or the possible implementations of the first aspect.

According to a fifth aspect, a signal processing apparatus is provided, including a processor and a communications interface. The processor is coupled to a memory. The processor may be configured to execute program code in the memory, to implement the signal processing method in any one of the first aspect or the possible implementations of the first aspect.

According to a sixth aspect, a computer-readable storage medium is provided. The computer-readable storage medium stores a computer program. When the computer program is executed by an apparatus, the apparatus is enabled to implement the signal processing method in any one of the first aspect or the possible implementations of the first aspect.

According to a seventh aspect, a computer program product including an instruction is provided. When the instruction is executed by a computer, the apparatus is enabled to implement the signal processing method in any one of the first aspect or the possible implementations of the first aspect.

BRIEF DESCRIPTION OF DRAWINGS

FIG. 8 (b) is a schematic structural diagram of a second polarization compensation module according to an embodiment of the present disclosure;

FIG. 9 (b) is a schematic diagram of an Rx DSP architecture in another multi-mode transmission scenario according to an embodiment of the present disclosure; FIG. 9 (c) is a schematic diagram of an Rx DSP architecture in still another multi-mode transmission scenario according to an embodiment of the present disclosure; FIG. 9 (d) is a schematic diagram of an Rx DSP architecture in still another multi-mode transmission scenario according to an embodiment of the present disclosure; FIG. 9 (e) is a schematic structural diagram of another DBP module according to an embodiment of the present disclosure;

FIG. 10 (b) is a schematic flowchart of DBP processing according to an embodiment of the present disclosure; FIG. 10 (c) is a schematic flowchart of obtaining a time-domain complex-number signal according to an embodiment of the present disclosure; FIG. 10 (d) is another schematic flowchart of obtaining a time-domain complex-number signal according to an embodiment of the present disclosure.

DESCRIPTION OF EMBODIMENTS

The following describes embodiments of the present disclosure with reference to accompanying drawings.

Figure 1:
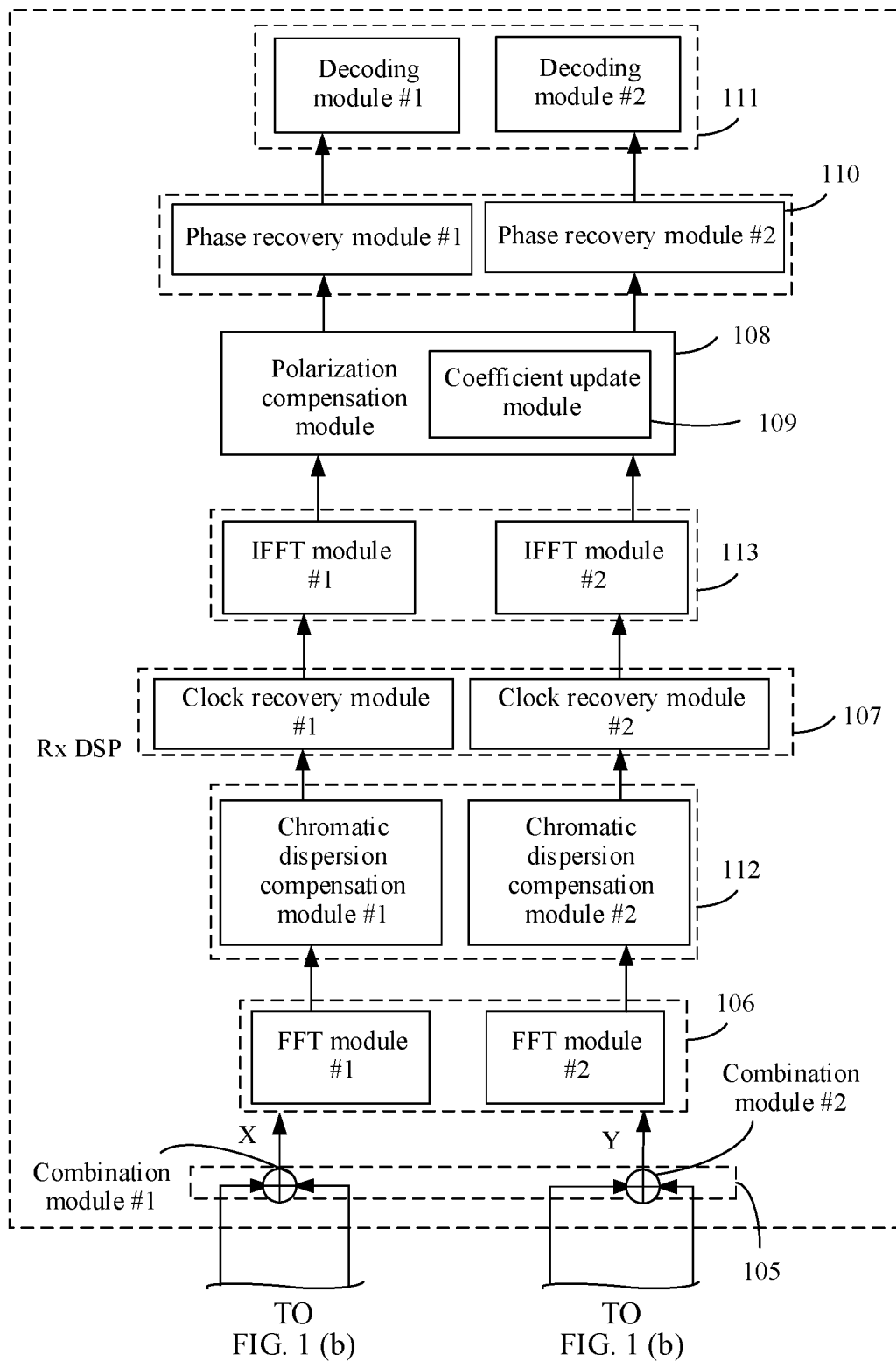
FIG. 1 (a) and FIG. 1 (b) are a schematic diagram of a polarization multiplexing coherent receiver.
Figure 1:
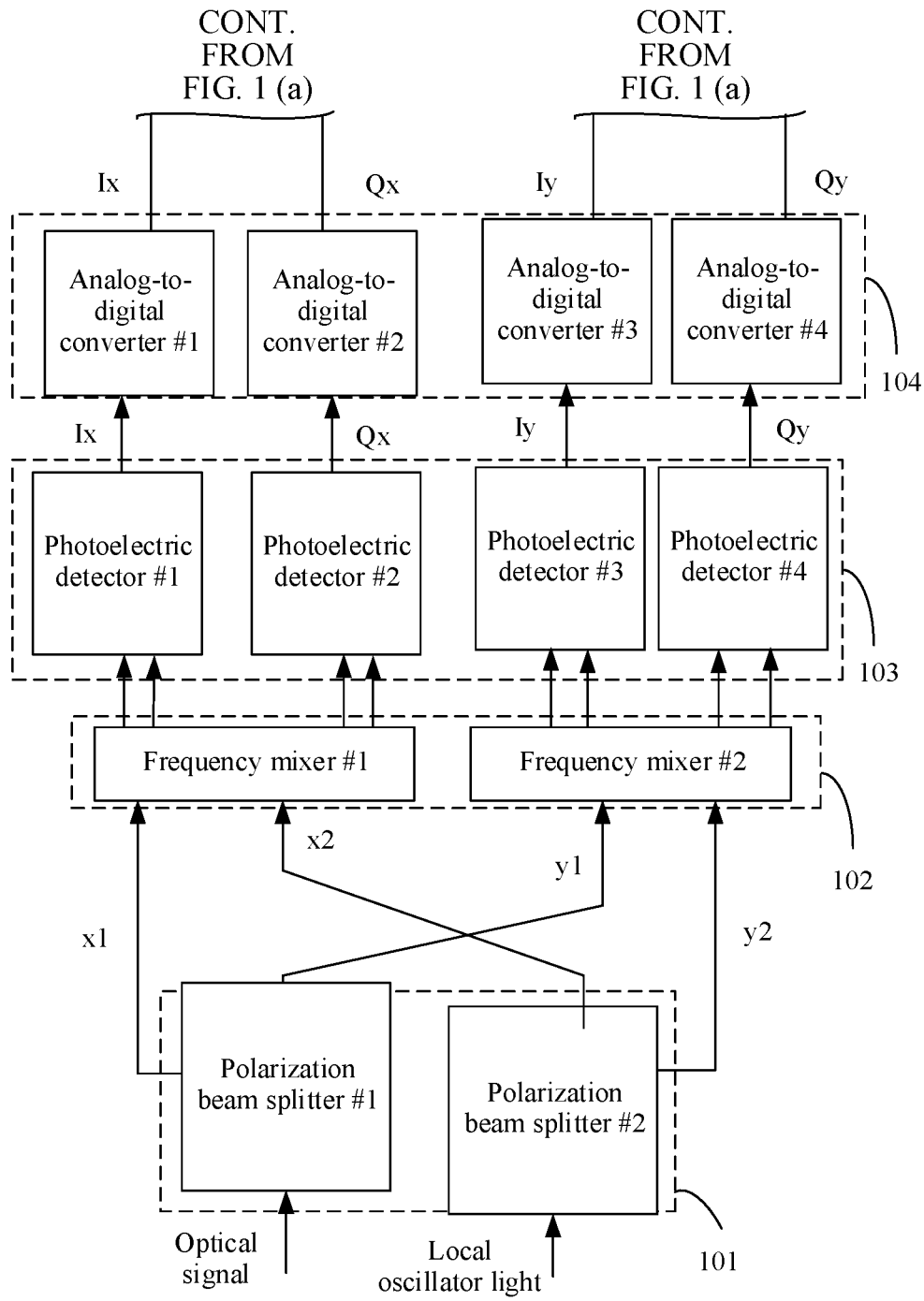

The technical solutions in the embodiments of the present disclosure relate to improvement of a polarization multiplexing coherent receiver. The following first describes a conventional polarization multiplexing coherent receiver with reference to FIG. 1 (a) and FIG. 1 (b). FIG. 1 (a) and FIG. 1 (b) are a schematic diagram of a single-mode polarization multiplexing coherent receiver.

It can be seen from FIG. 1 (a) and FIG. 1 (b) that a signal processing procedure of the single-mode polarization multiplexing coherent receiver includes the following steps:

An optical signal is split into signals x1 and y1 through processing by a polarization beam splitter #1 in a polarization beam splitter (Polarization beam splitter) 101. x1 is sent to a frequency mixer #1 in a frequency mixer (Hybrid) 102, and y1 is sent to a frequency mixer #2 in the frequency mixer 102.

Local oscillator light (for example, generated by a local laser (local laser) or a transmitter) is split into signals x2 and y2 through processing by a polarization beam splitter #2 in the polarization beam splitter 101. x2 is sent to the frequency mixer #1 in the frequency mixer 102, and y2 is sent to the frequency mixer #2 in the frequency mixer 102.

It should be noted that an optical signal or the local oscillator light has two polarization modes: transverse electric (transverse electric, TE) and transverse magnetic (transverse magnetic, TM), which may also be referred to as a polarization state X and a polarization state Y, or may also be referred to as a polarization direction X and a polarization direction Y.

The polarization state X and the polarization state Y are orthogonal to each other. To be specific, after undergoing polarization rotation, a light beam in a single polarization state (a polarization state Y) becomes a light beam in a polarization state X. It should be noted that X and Y herein are not an x-axis and a y-axis in a narrow sense, but are two orthogonal directions in a broad sense, for example, a horizontal +45° direction and a vertical −45° direction.

The frequency mixer #1 and the frequency mixer #2 output four signals. The four signals are used as input of a photoelectric detector (Photodiode) 103, and are separately input to a photoelectric detector #1 to a photoelectric detector #4. The photoelectric detector is configured to convert strength of an optical signal into strength of an electrical signal.

An output signal of the photoelectric detector #1 is a signal Ix, an output signal of the photoelectric detector #2 is a signal Qx, an output signal of the photoelectric detector #3 is a signal Iy, and an output signal of the photoelectric detector #4 is a signal Qy.

Ix, Qx, Iy, and Qy are converted by an analog-to-digital converter #1 to an analog-to-digital converter #4 in an analog-to-digital converter (ADC) 104 respectively, and digital signals Ix, Qx, Iy, and Qy obtained through analog-to-digital conversion are output. Ix and Qx are combined by a combination module #1 in a combination module 105 to obtain a complex-number signal X. Iy and Qy are combined by a combination module #2 in the combination module 105 to obtain a complex-number signal Y. For example, the combination module in the present disclosure may also be referred to as an adder.

The complex-number signal X is input to an FFT module #1 in an FFT module 106, and is processed by the FFT module #1 to obtain a frequency-domain signal X that has undergone fast Fourier transform. The complex-number signal Y is input to an FFT module #2 in the FFT module 106, and is processed by the FFT module #2 to obtain a frequency-domain signal Y that has undergone fast Fourier transform.

The frequency-domain signal X is input to a chromatic dispersion compensation module #1 in a chromatic dispersion compensation (CDC) module 112, and chromatic dispersion compensation is performed in frequency domain to obtain a frequency-domain signal X that has undergone the frequency-domain dispersion compensation. The frequency-domain signal Y is input to a chromatic dispersion compensation module #2 in the chromatic dispersion compensation module 112, and chromatic dispersion compensation is performed in frequency domain to obtain a frequency-domain signal Y that has undergone the frequency-domain chromatic dispersion compensation.

The frequency-domain signal X obtained through frequency-domain chromatic dispersion compensation is input to a clock recovery module #1 in a clock recovery module 107, and clock recovery is performed to obtain a frequency-domain signal X that has undergone the clock recovery. The frequency-domain signal Y obtained through frequency-domain chromatic dispersion compensation is input to a clock recovery module #2 in the clock recovery module 107, and clock recovery is performed to obtain a frequency-domain signal Y that has undergone the clock recovery.

The frequency-domain signal X obtained through clock recovery is input to an IFFT module #1 in an IFFT module 113, and is processed by the IFFT module #1 to obtain a time-domain signal X that has undergone inverse fast Fourier transform. The frequency domain signal Y obtained through clock recovery is input to an IFFT module #2 in the IFFT module 113, and is processed by the IFFT module #2 to obtain a time-domain signal Y that has undergone inverse fast Fourier transform.

Both the time-domain signal X and the time-domain signal Y are input to a polarization compensation module 108. Optionally, the polarization compensation module 108 includes 2×2 butterfly filters, and performs polarization demultiplexing and impairment equalization to obtain a time-domain signal X and a time-domain signal Y that have undergone polarization compensation. Specifically, as shown in FIG. 1 (a) and FIG. 1 (b), the polarization compensation module 108 further includes a coefficient update module 109. The coefficient update module 109 is configured to update a coefficient of a filter included in the polarization compensation module 108.

The complex-number signal X obtained through polarization compensation is sequentially sent to a phase recovery module #1 in a phase recovery module 110 and a decoding module #1 in a decoding (decoder) module 111 to obtain a bit signal. The complex-number signal Y obtained through polarization compensation is sequentially sent to a phase recovery module #2 in the phase recovery module 110 and a decoding module #2 in the decoding module 111 to obtain a bit signal.

It should be noted that, because the FFT module 106 and the IFFT module 113 are introduced into the current signal processing procedure of the coherent receiver, the following cases may occur:

(1) Complexity of FFT transformation increases with a quantity of transformation points at a speed of N log 2N.

(2) FFT transformation includes a large quantity of multiplication operations, and multiplication complexity is quite high.

(3) An FFT transformation matrix is a complex-number matrix based on an exponent e, and cannot accurately indicate a truncation error and a fixed-point penalty on a computer with a limited quantity of bits.

This embodiment of the present disclosure mainly relates to improvement of a processing procedure after the ADC. Therefore, for ease of description, the processing procedure after the ADC is collectively referred to as a receiver digital signal processing (Rx DSP) procedure, for example, an Rx DSP signal processing procedure included in a large dashed-line box in FIG. 1 (a) and FIG. 1 (b).

For ease of understanding, several basic concepts in the present disclosure are briefly described.

1. Polarization Multiplexing

A transmission mode, that is, an $HE_{11}$ mode, for an optical signal in a single-mode optical fiber includes two sub-modes: $HE^x_{11}$ and $HE^y_{11}$. The two sub-modes are independent of each other, and their polarization directions are orthogonal to each other. The two sub-modes present different forms in a transmission process: linear polarization, elliptical polarization, and circular polarization, but always remain orthogonal. X-polarization and Y-polarization in the present disclosure are two orthogonal polarization states in a multiplexing single-mode optical fiber.

Compared with the single-mode optical fiber, a multi-mode optical fiber can transmit signals in a plurality of modes. Currently, an $LP_{pq}$ mode is commonly used. Values of p and q represent different mode field characteristics of an LP mode.

2. NTT Processing and INTT Processing

Both NTT processing and FFT processing in the present disclosure belong to transformation for implementing fast convolution. The FFT processing is complex-number transformation whose core is $K=\exp(j\alpha)$. $\exp(j\alpha)$ is a complex number and has a truncation error in storage. In addition, multiplication complexity of the complex number is quite high. NTT transformation is transformation that is defined in a finite field and whose core is K (K is an integer). Usually, K is 2. Therefore, a transformation matrix has no truncation error. On a binary computer, both multiplication and division of 2 can be implemented through shifting, so that multiplication can be avoided and power consumption can be reduced.

In addition, the INTT processing is an inverse process of the NTT processing, and IFFT is an inverse process of the FFT processing. Details are not described in the present disclosure.

3. Transform Domain and Time Domain

A time-domain signal in the embodiments of the present disclosure is a signal that is input to an Rx DSP process through analog-to-digital conversion. A signal obtained by performing FFT processing on the time-domain signal is referred to as a frequency-domain signal, and a signal obtained through NTT processing is referred to as a transform-domain signal.

In addition, a time-domain signal is obtained by performing IFFT processing on the frequency-domain signal, and a time-domain signal is obtained by performing INTT processing on the transform-domain signal.

To be specific, the time-domain signal in the present disclosure may be understood as a signal at a time granularity, and may change as time changes; the frequency-domain signal may be understood as a frequency-domain representation into which a time-domain signal is converted through transformation from time domain to frequency domain; and likewise, the transform-domain signal may be understood as a transform-domain representation into which a time-domain signal is converted through transformation from time domain to transform domain. During a process of transformation from time domain to transform domain, a time-domain signal is usually segmented, then a part is superposed at a beginning and an end, and then the signal is sent to an NTT/INTT transformation module. For example, a segment of time-domain data includes 1024 points. A time-domain signal is first divided into 512 points, then 256 points are superposed at a beginning and an end, and then the 1024 points are sent to the NTT/INTT transformation module. 512, 256, and 1024 herein are merely examples. A specific superposition proportion and a specific quantity of points in a segment are not limited in the present disclosure. A quantity of points of data transformation is an array length during the data transformation. Generally, a larger quantity of points contributes to better transformation performance.

4. In-Phase Real-Number Signal and Quadrature Real-Number Signal

Quadrature amplitude modulation is widely used in modem coherent communications. The quadrature amplitude modulation is a modulation scheme in which amplitude modulation is performed on two orthogonal carriers. The two carriers are usually sine waves with a phase difference of 90°, and therefore are referred to as orthogonal carriers. The real part of a complex-number signal is referred to as a codirectional component, and the imaginary part of the signal is referred to as a quadrature component.

It should be noted that both a real part and an imaginary part of a complex-number signal (for example, X=a+bj) are real numbers (for example, both a and b are real numbers). Therefore, in the present disclosure, the codirectional component is referred to as an in-phase real-number signal, and the quadrature component is referred to as a quadrature real-number signal.

It can be seen from the foregoing descriptions that introducing the FFT module and the IFFT module into an electrical signal processing procedure of the coherent receiver may increase complexity of the signal processing procedure. To resolve a problem in the existing electrical signal processing procedure of the coherent receiver and reduce power consumption of an algorithm, the embodiments of the present disclosure provide a signal processing method and apparatus, in which an electrical signal is processed without introducing the FFT module or the IFFT module, thereby improving performance of the polarization multiplexing coherent receiver in processing an electrical signal and reducing complexity.

The following describes in detail the signal processing method and apparatus provided in the embodiments of the present disclosure with reference to the accompanying drawings. The signal processing method provided in the embodiments of the present disclosure may be used by a polarization multiplexing coherent receiver to process an electrical signal in a single-mode or multi-mode transmission scenario.

Figure 2:
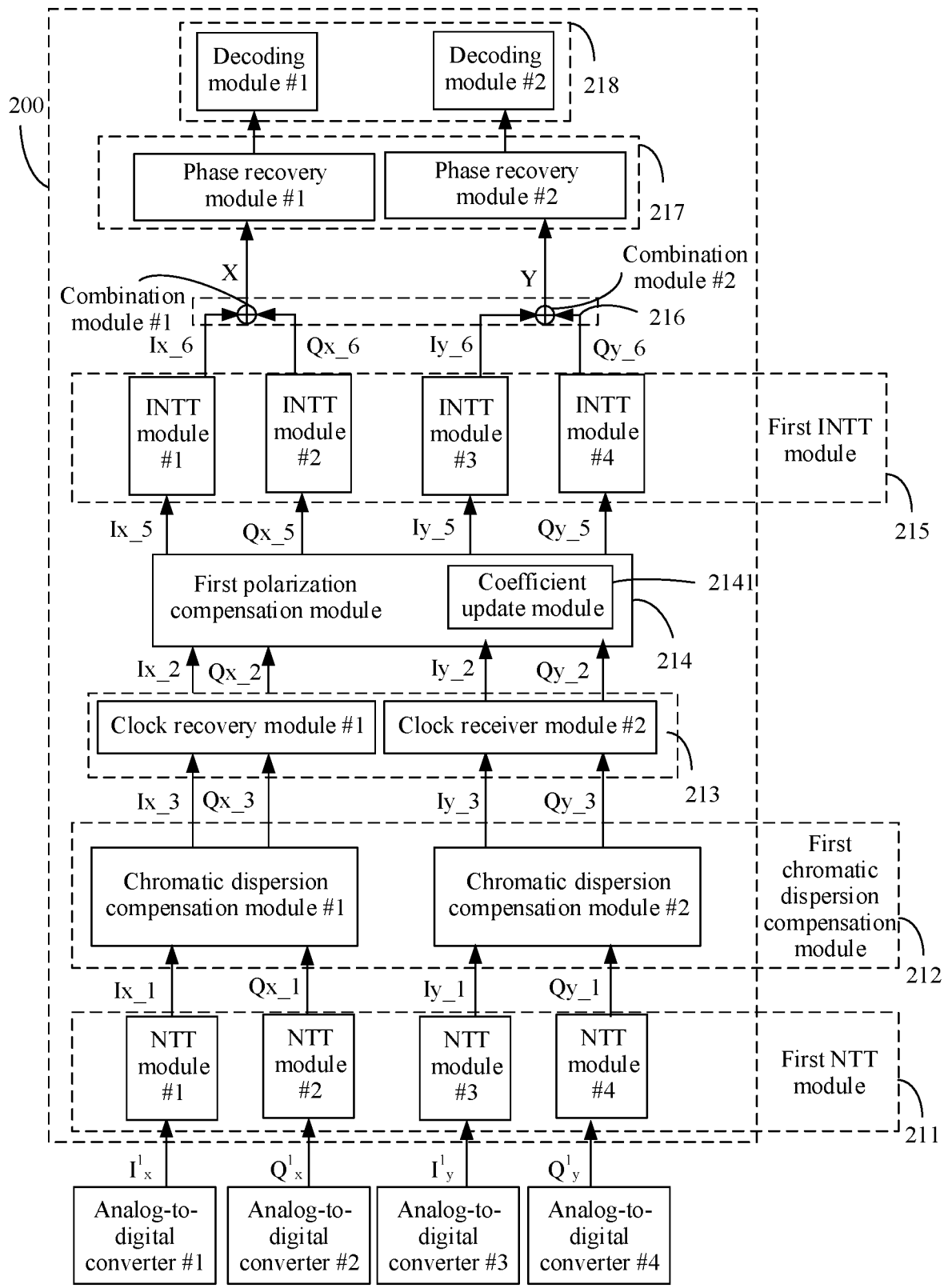
FIG. 2 is a schematic diagram of an Rx DSP architecture according to an embodiment of the present disclosure.

FIG. 2 is a schematic diagram of an Rx DSP architecture according to an embodiment of the present disclosure. The Rx DSP architecture 200 includes:

a first NTT module 211, a first chromatic dispersion compensation module 212, a clock recovery module 213, a first polarization compensation module 214, a first INTT module 215, a combination module 216, a phase recovery module 217, and a decoding module 218.

The first NTT module includes an NTT module #1, an NTT module #2, an NTT module #3, and an NTT module #4. Signals $I^1_x$, $Q^1_x$, and $Q^1_y$ are input to the NTT module #1, the NTT module #2, the NTT module #3, and the NTT module #4 respectively.

Optionally, the signals $I^1_x$, $Q^1_x$, $I^1_y$, and $Q^1_y$ are real-number signals obtained through conversion by an ADC.

The NTT module #1, the NTT module #2, the NTT module #3, and the NTT module #4 perform NTT processing on $I^1_x$, $Q^1_x$, $I^1_y$, and $Q^1_y$ respectively, and output transform-domain first real-number signals Ix_1, Qx_1, Iy_1, and Qy_1 to the first chromatic dispersion compensation module 212.

The first chromatic dispersion compensation module 212 includes a chromatic dispersion compensation module #1 and a chromatic dispersion compensation module #2. Ix_1 and Qx_1 are input to the chromatic dispersion compensation module #1, and chromatic dispersion compensation is performed to obtain transform-domain third real-number signals Ix_3 and Qx_3. Iy_1 and Qy_1 are input to the chromatic dispersion compensation module #2, and chromatic dispersion compensation is performed to obtain transform-domain third real-number signals Iy_3 and Qy_3.

The clock recovery module 213 includes a clock recovery module #1 and a clock recovery module #2. Ix_3 and Qx_3 are input to the clock recovery module #1, and clock recovery is performed to obtain transform-domain second real-number signals Ix_2 and Qx_2. Iy_3 and Qy_3 are input to the clock recovery module #2, and clock recovery is performed to obtain transform-domain second real-number signals Iy_2 and Qy_2.

The second real-number signals Ix_2, Qx_2, Iy_2, and Qy_2 are input to the first polarization compensation module 214, and polarization demultiplexing and impairment equalization are performed to obtain transform-domain sixth real-number signals Ix_5, Qx_5, Iy_5, and Qy_5. Optionally, the first polarization compensation module 214 further includes a coefficient update module 2141. The coefficient update module 2141 is configured to update a coefficient of a filter included in the first polarization compensation module 214.

The first INTT module 215 includes an INTT module #1, an INTT module #2, an INTT module #3, and an INTT module #4. Signals Ix_5, Qx_5, Iy_5, and Qy_5 are input to the INTT module #1, the INTT module #2, the INTT module #3, and the INTT module #4 respectively.

The INTT module #1, the INTT module #2, the INTT module #3, and the INTT module #4 perform INTT processing on Ix_5, Qx_5, Iy_5, and Qy_5 respectively, and output time-domain seventh real-number signals Ix_6, Qx_6, Iy_6, and Qy_6 to the combination module 216.

The combination module 216 includes a combination module #1 and a combination module #2. Ix_6 and Qx_6 are input to the combination module #1, and are combined to obtain a time-domain complex-number signal X. Iy_6 and Qy_6 are input to the combination module #2, and are combined to obtain a time-domain complex-number signal Y.

The phase recovery module 217 includes a phase recovery module #1 and a phase recovery module #2. The decoding module 111 includes a decoding module #1 and a decoding module #2. The time-domain complex-number signal X is sequentially input to the phase recovery module #1 and the decoding module #1 to obtain a recovered bit signal. The time-domain complex-number signal Y is sequentially input to the phase recovery module #2 and the decoding module #2 to obtain a recovered bit signal.

The Rx DSP architecture 200 shown in FIG. 2 may be referred to as a full-transform-domain Rx DSP architecture. The full-transform-domain Rx DSP architecture not only performs chromatic dispersion compensation based on NTT/INTT, but also performs polarization compensation based on NTT/INTT, that is, performs chromatic dispersion compensation and polarization compensation in transform domain. Specifically, polarization equalization impairment compensation is performed in transform domain, and multiplication is used to replace convolution, so that power consumption can be further reduced. In addition, a quantity (size) of transformation points can be increased, so that an impairment is effectively equalized and performance is improved.

Figure 3:
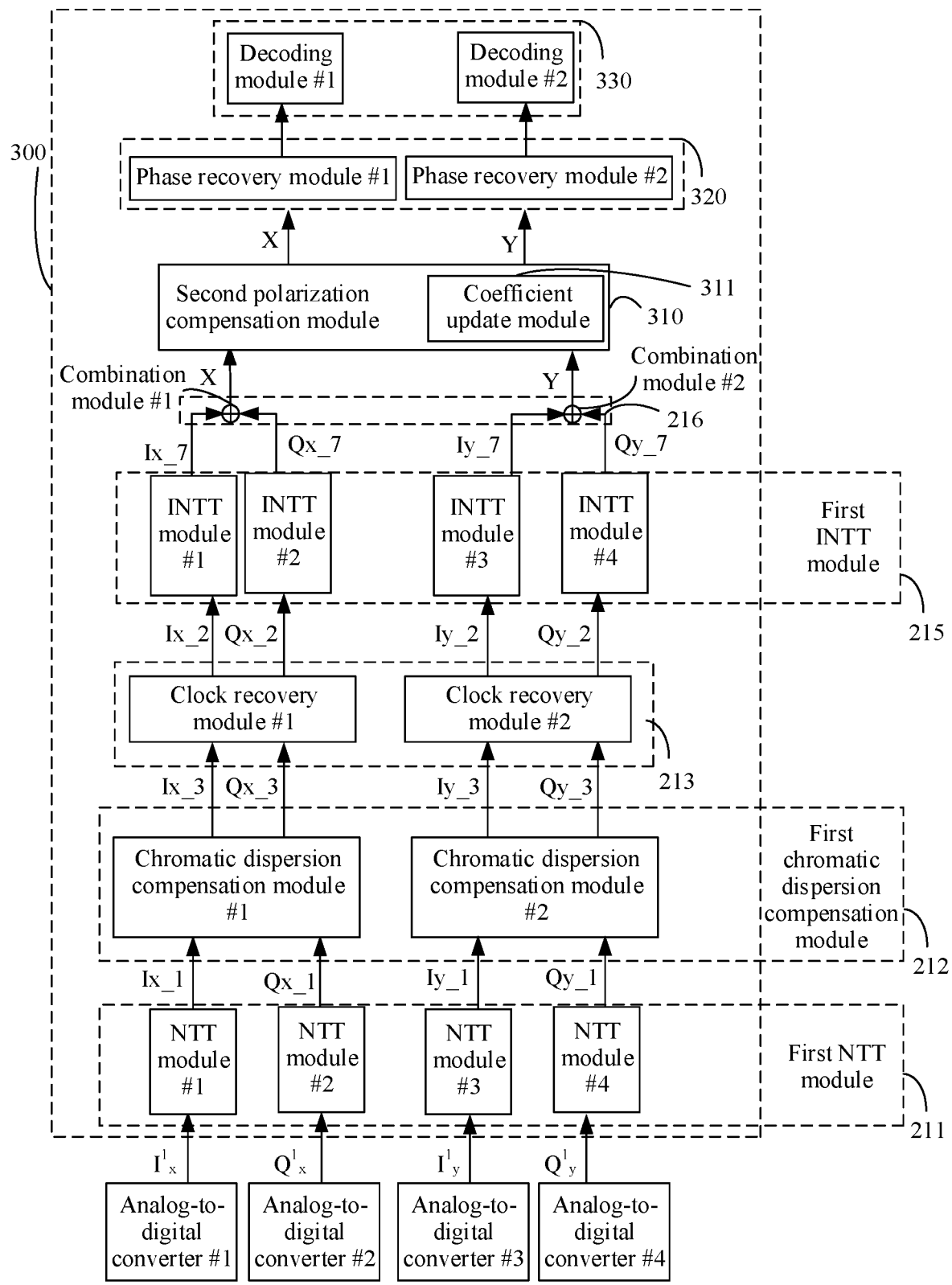
FIG. 3 is a schematic diagram of another Rx DSP architecture according to an embodiment of the present disclosure.

FIG. 3 is a schematic diagram of another Rx DSP architecture according to an embodiment of the present disclosure. The Rx DSP architecture 300 includes:

a first NTT module 211, a first chromatic dispersion compensation module 212, a clock recovery module 213, a second polarization compensation module 310, a coefficient update module 311, a first INTT module 215, a combination module 216, a phase recovery module 320, and a decoding module 330.

Modules before clock recovery in the architecture 300 are the same as those in the architecture 200. A difference lies in that a signal output by the clock recovery module 213 is first processed by the INTT module 215 and combined by the combination module 216, and then input to the second polarization compensation module 310. A process before the clock recovery is not described again.

The first INTT module 215 includes an INTT module #1, an INTT module #2, an INTT module #3, and an INTT module #4. Second real-number signals Ix_2, Qx_2, Iy_2, and Qy_2 are input to the INTT module #1, the INTT module #2, the INTT module #3, and the INTT module #4 respectively.

The INTT module #1, the INTT module #2, the INTT module #3, and the INTT module #4 perform INTT processing on Ix_2, Qx_2, Iy_2, and Qy_2 respectively, and output time-domain eighth real-number signals Ix_7, Qx_7, Iy_7, and Qy_7 to the combination module 216.

The combination module 216 includes a combination module #1 and a combination module #2. Ix_7 and Qx_7 are input to the combination module #1, and are combined to obtain a time-domain complex-number signal X. Iy_7 and Qy_7 are input to the combination module #2, and are combined to obtain a time-domain complex-number signal Y.

The time-domain complex-number signal X and the time-domain complex-number signal Y are input to the second polarization compensation module 310, and polarization demultiplexing and impairment equalization are performed to obtain a time-domain complex-number signal X and a time-domain complex-number signal Y that have undergone polarization compensation. The second polarization compensation module 310 further includes a coefficient update module 311. The coefficient update module 311 is configured to update a coefficient of a filter included in the second polarization compensation module 310.

The phase recovery module 320 includes a phase recovery module #1 and a phase recovery module #2. The decoding module 330 includes a decoding module #1 and a decoding module #2. The time-domain complex-number signal X obtained through polarization compensation is sequentially input to the phase recovery module #1 and the decoding module #1 to obtain a recovered bit signal. The time-domain complex-number signal Y obtained through polarization compensation is sequentially input to the phase recovery module #2 and the decoding module #2 to obtain a recovered bit signal.

The Rx DSP architecture 300 shown in FIG. 3 may be referred to as an Rx DSP architecture combining time domain and transform domain. In the Rx DSP architecture combining time domain and transform domain, chromatic dispersion compensation is performed based on NTT/INTT, and polarization compensation is still performed in time domain, that is, chromatic dispersion compensation is performed in transform domain but polarization compensation is performed in time domain. Specifically, a chromatic dispersion compensation module with quite high power consumption implements compensation in transform domain, so that overall power consumption can be effectively reduced, and a polarization equalization module is left in time domain to perform compensation, so that a capability of the equalization module in resisting a loop delay is enhanced.

Figure 4:
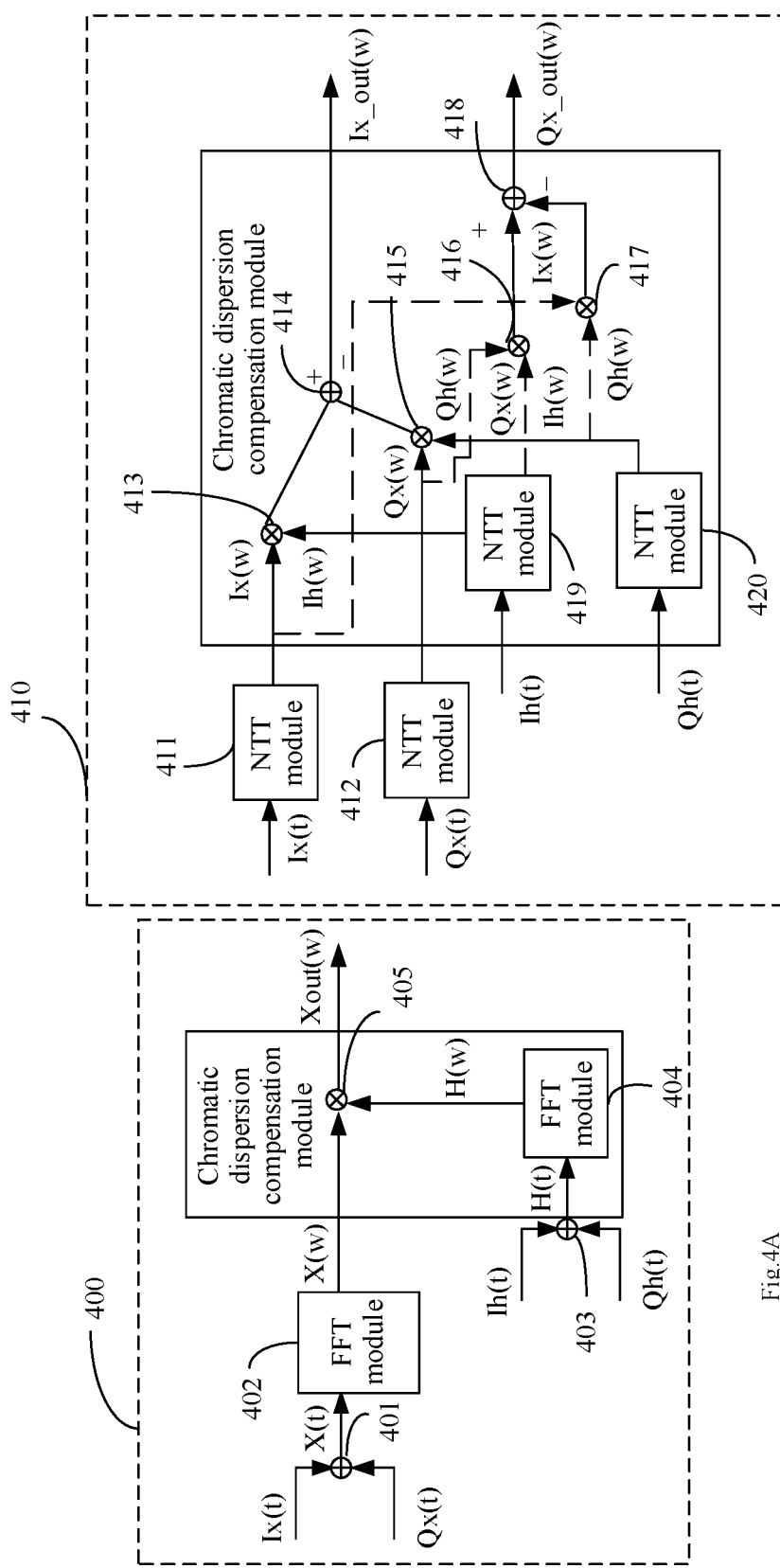
FIG. 4A is a schematic diagram of implementing chromatic dispersion compensation based on FFT transformation.
FIG. 4B is a schematic structural diagram of a chromatic dispersion compensation module according to an embodiment of the present disclosure.

FIG. 4 (a) is a schematic structural diagram of a chromatic dispersion compensation module 400. The chromatic dispersion compensation module 400 may be applied to the architecture shown in FIG. 1 (a) and FIG. 1 (b). The chromatic dispersion compensation module includes an FFT module 402, an FFT module 404, a combination module 401, a combination module 403, and a multiplication module 405.

Signals are transmitted in an optical fiber. Impact of chromatic dispersion of the optical fiber on the signals may be described as an impulse response. In time-domain chromatic dispersion equalization, a finite impulse response (FIR) is used for compensation. An FIR coefficient is as follows:

$$h(t) = \frac{1}{\sqrt{2\beta_2 z}} \exp\left(\frac{-jt^2}{2\beta_2 z}\right).$$

$\beta_2$ indicates a chromatic dispersion coefficient of an optical fiber, z indicates a transmission distance of a signal in the optical fiber, j indicates an imaginary number, and t indicates time. Because a signal in a polarization direction x and a signal in a polarization direction y undergo a same chromatic dispersion impairment, a same function h(t) is used during equalization.

In the FFT-based chromatic dispersion compensation module in the signal processing procedure shown in FIG. 1 (a) and FIG. 1 (b), input of the chromatic dispersion compensation module is a frequency-domain complex-number signal X (co).

For example, $I_h(t)$ and $Q_h(t)$ are time-domain chromatic dispersion impulse responses, $I_h(t)$ and $Q_h(t)$ are combined by the combination module 403 into a complex-number impulse response H(t), H(t) is input to the FFT module 404 to obtain a frequency-domain equalization function H(ω), and H(ω) and X(ω) are input to the multiplication module 405, and are multiplied to obtain output of the chromatic dispersion compensation module: Xout(ω)=H(ω)·X(ω).

FIG. 4 (b) is a schematic structural diagram of a chromatic dispersion compensation module 410 according to an embodiment of the present disclosure. The chromatic dispersion compensation module 410 may be applied to the RX DSP architectures 200 and 300. The chromatic dispersion compensation module includes an NTT module 411, an NTT module 412, an NTT module 419, an NTT module 420, a combination module 414, a combination module 418, a multiplication module 413, a multiplication module 415, a multiplication module 416, and a multiplication module 417.

In the signal processing procedures shown in FIG. 2 and FIG. 3, the NTT-based chromatic dispersion compensation module separately performs chromatic dispersion compensation on a signal in a polarization direction x and a signal in a polarization direction y. A chromatic dispersion compensation process (as shown in FIG. 4 (b)) is described by using chromatic dispersion compensation in the polarization direction x as an example.

For example, a chromatic dispersion impulse response h(t) in the polarization direction x is split into $I_h(t)$ and $Q_h(t)$, where $$Ih(t) = \frac{1}{\sqrt{2\beta_2 z}} \cos\left(\frac{t^2}{2\beta_2 z}\right), \text{ and } Qh(t) = \frac{-1}{\sqrt{2\beta_2 z}} \sin\left(\frac{t^2}{2\beta_2 z}\right).$$

$I_h(t)$ and $Q_h(t)$ are input to the NTT module 419 and the NTT module 420 respectively, and are transformed to obtain chromatic dispersion equalization functions $I_h(w)$ and $Q_h(w)$ in NTT transform domain. A codirectional signal Ix(t) and a quadrature signal Qx(t) in the polarization direction x are input to the NTT module 411 and the NTT module 412 respectively, and are transformed to obtain transform-domain signals $I_x(w)$ and $Q_x(w)$.

It can be seen from FIG. 4 (b) that a result obtained by inputting the transform-domain codirectional signal $I_x(w)$ and the codirectional component $I_h(w)$ of the equalization function to the multiplication module 413 and performing multiplication, and a result obtained by inputting the transform-domain quadrature signal $Q_x(w)$ and the quadrature component $Q_h(w)$ of the equalization function to the multiplication module 415 and performing multiplication are combined by the combination module 414 as follows: Ix_out (w)=$I_x(w) \cdot I_h(w) - Q_x(w) \cdot Q_h(w)$.

A result obtained by inputting $Q_x(w)$ and $I_h(w)$ to the multiplication module 416 and performing multiplication, and a result obtained by inputting $I_x(w)$ and $Q_h(w)$ to the multiplication module 417 and performing multiplication are combined by the combination module 418 as follows: $Q_x$ out(w)=$Q_x(w) \cdot I_h(w) - I_x(w) \cdot Q_h(w)$.

Likewise, when chromatic dispersion compensation is performed in the polarization direction y, a codirectional signal $I_y(t)$ and a quadrature signal $Q_y(t)$ in the polarization direction y are input to NTT modules, and are transformed to obtain transform-domain signals $I_y(w)$ and $Q_y(w)$ respectively. A chromatic dispersion compensation process in the polarization direction y may be described by using the following formulas:

$$Iy\_out(w) = I_y(w) \cdot I_h(w) - Q_y(w) \cdot Q_h(w); \text{ and}$$

$$Qy\_out(w) = Q_y(w) \cdot I_h(w) + I_y(w) \cdot Q_h(w).$$

In an actual operation, the equalization function H(o) in Fourier transform domain in FIG. 4 (a) and the chromatic dispersion equalization functions $I_h(w)$ and $Q_h(w)$ in number theoretic transform domain in FIG. 4 (b) need to be calculated only once and stored in a memory, and may be repeatedly invoked for different input signals.

For example, one NTT transformation and one FFT transformation are used as examples to explain a difference between the two types of transformations:

Transformation matrices of both FFT and NTT may be represented as follows:

$$H = \begin{bmatrix} 1 & 1 & \cdots & 1 \\ 1 & \alpha^{1*1} & \cdots & \alpha^{1*(N-1)} \\ \cdots & \cdots & \cdots & \cdots \\ 1 & \alpha^{(N-1)*1} & \cdots & \alpha^{(N-1)*(N-1)} \end{bmatrix}.$$

A difference lies in a transformation core $$\alpha = e^{-\frac{j2\pi}{N}}$$

of FFT. A transformation core $\alpha$ of NTT is a power of 2. Usually, $\alpha$ is 2 (or may be $\sqrt{2}$ or another value, which is not limited in the present disclosure). For example, $\alpha=2$. Each element in a transformation matrix is still a power of 2, and multiplication by 2 or a power of 2 in a binary operation may be performed through bit shifting.

Correspondingly, for example, the core $\alpha=2$. A transformation matrix H of NTT and a transformation matrix $H^{-1}$ of INTT are respectively as follows:

$$H = \begin{bmatrix} 1 & 1 & \cdots & 1 \\ 1 & 2^{1*1} & \cdots & 2^{1*(N-1)} \\ \cdots & \cdots & \cdots & \cdots \\ 1 & 2^{(N-1)*1} & \cdots & 2^{(N-1)*(N-1)} \end{bmatrix};$$

$$H^{-1} = \begin{bmatrix} 1 & 1 & \cdots & 1 \\ 1 & 2^{-1*1} & \cdots & 2^{-1*(N-1)} \\ \cdots & \cdots & \cdots & \cdots \\ 1 & 2^{-(N-1)*1} & \cdots & 2^{-(N-1)*(N-1)} \end{bmatrix}.$$

Internal working processes of the clock recovery module #1 and the clock recovery module #2 are similar to that in FIG. 4 (b), and only the chromatic dispersion equalization functions $I_h(w)$ and $Q_h(w)$ need to be replaced with functions for equalizing clock delays. A delay caused by a clock is expressed as h(t)=exp(−2πft$_0$) by using a time-domain finite impulse response. In the clock recovery module, $I_h(w)$ and $Q_h(w)$ may be replaced with NTT transformation of cos (2πft$_0$). Details are not described herein.

Figure 5:
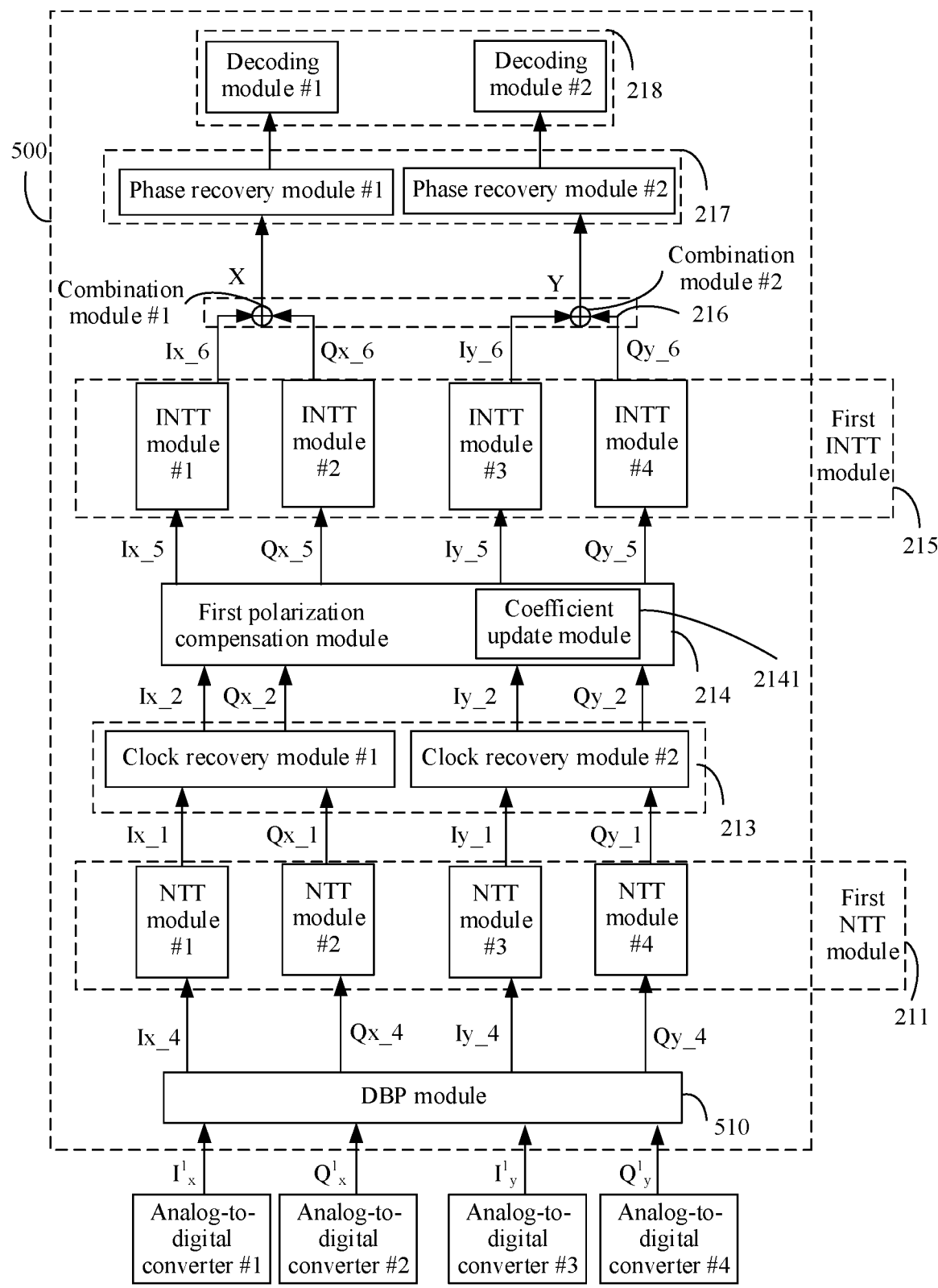
FIG. 5 is a schematic diagram of still another Rx DSP architecture according to an embodiment of the present disclosure.

FIG. 5 is a schematic diagram of still another Rx DSP architecture according to an embodiment of the present disclosure. The Rx DSP architecture 500 includes:

a digital back propagation (digital back propagation, DBP) module 510, a first NTT module 211, a clock recovery module 213, a first polarization compensation module 214, a first INTT module 215, a combination module 216, a phase recovery module 217, and a decoding module 218.

An architecture after the first polarization compensation module 214 in the Rx DSP architecture 500 is the same as that in the Rx DSP architecture 200. A difference lies in that a signal undergoes DBP processing before polarization compensation. Because the DBP module 510 has a chromatic dispersion compensation function, a process after the DBP module may not require the chromatic dispersion compensation module 212.

Signals $I^1_x$, $Q^1_x$, $I^1_y$, and $Q^1_y$ are input to the DBP module 510, DBP processing is performed, and time-domain tenth real-number signals Ix_4, Qx_4, Iy_4, and Qy_4 are output to the first NTT module 211.

The first NTT module 211 includes an NTT module #1, an NTT module #2, an NTT module #3, and an NTT module #4. Ix_4, Qx_4, Iy_4, and Qy_4 are input to the NTT module #1, the NTT module #2, the NTT module #3, and the NTT module #4 respectively.

The NTT module #1, the NTT module #2, the NTT module #3, and the NTT module #4 perform NTT processing on Ix_4, Qx_4, Iy_4, and Qy_4 respectively, and output transform-domain first real-number signals Ix_1, Qx_1, Iy_1, and Qy_1 to the clock recovery module 213.

The clock recovery module 213 includes a clock recovery module #1 and a clock recovery module #2. Ix_1 and Qx_1 are input to the clock recovery module #1, and clock recovery is performed to obtain transform-domain second real-number signals Ix_2 and Qx_2. Iy_1 and Q$_y$_1 are input to the clock recovery module #2, and clock recovery is performed to obtain transform-domain second real-number signals Iy_2 and Qy_2.

For a process after the clock recovery module 213, refer to the embodiment shown in FIG. 2.

The Rx DSP architecture 500 shown in FIG. 5 may be referred to as a full-transform-domain Rx DSP architecture in which DBP is added. A difference from the full-transform-domain Rx DSP architecture shown in FIG. 2 lies in that the DBP module is added. It should be understood that in the full-transform-domain Rx DSP architecture shown in FIG. 2, only a linear impairment of an optical fiber is compensated for, for example, chromatic dispersion compensation. In the full-transform-domain Rx DSP architecture in which the DBP module is added, the DBP module is used to implement nonlinear-effect compensation on a basis of a linear impairment, to increase a signal transmission distance.

Figure 6:
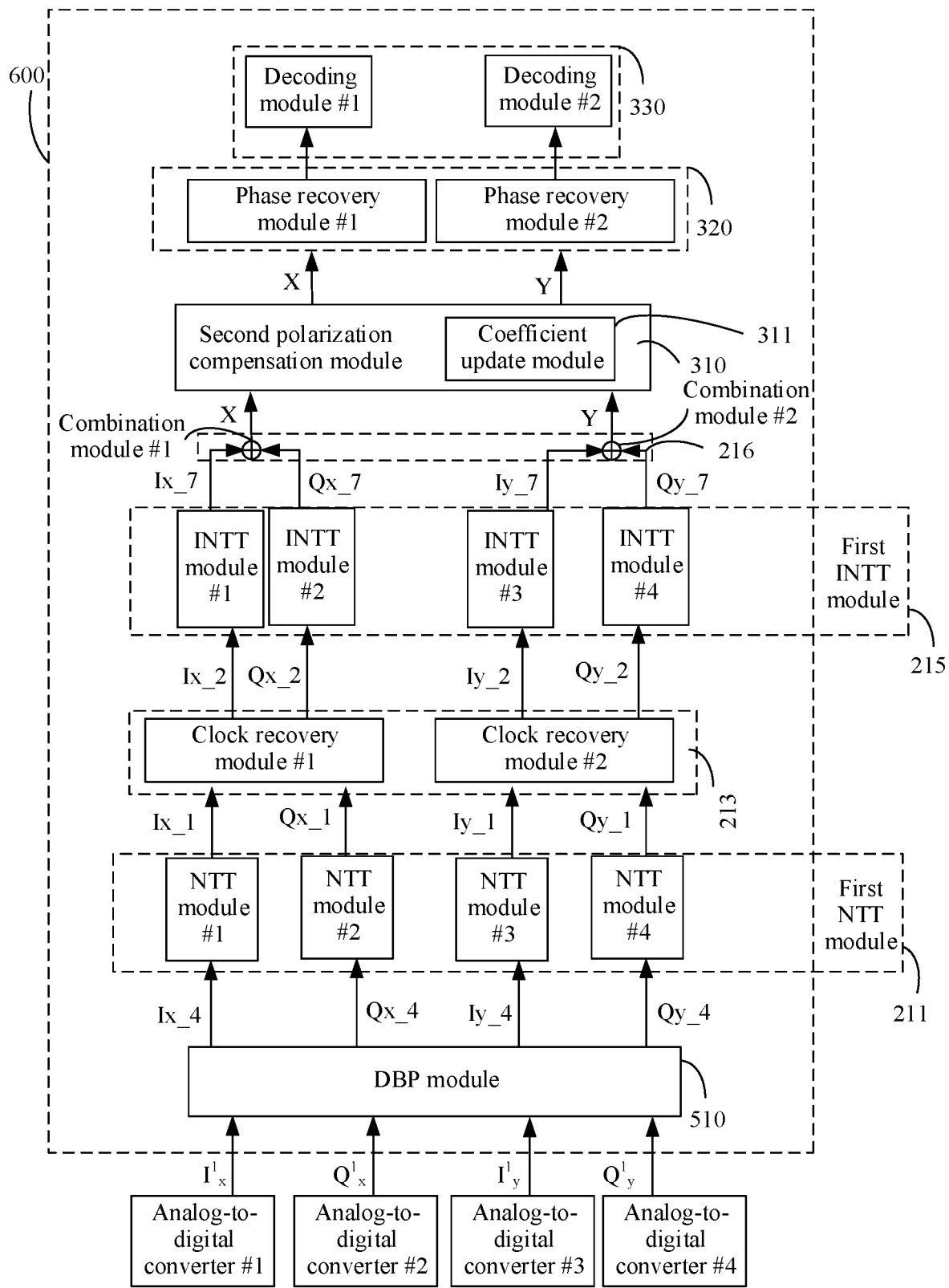
FIG. 6 is a schematic diagram of still another Rx DSP architecture according to an embodiment of the present disclosure.

FIG. 6 is a schematic diagram of still another Rx DSP architecture according to an embodiment of the present disclosure. The Rx DSP architecture 600 includes:

a DBP module 510, a first NTT module 211, a clock recovery module 213, a second polarization compensation module 310, a coefficient update module 311, a first INTT module 215, a combination module 216, a phase recovery module 320, and a decoding module 330.

An architecture after the second polarization compensation module 310 in the Rx DSP architecture 600 is the same as that in the Rx DSP architecture 300. An architecture before the second polarization compensation module 310 is the same as that in the Rx DSP architecture 500. To be specific, a received signal obtained through conversion by an ADC first undergoes DBP processing. For a process before the DBP processing and clock recovery, refer to the embodiment shown in FIG. 5. For a process after the clock recovery module 213, refer to the embodiment shown in FIG. 3.

The Rx DSP architecture 600 shown in FIG. 6 may be referred to as an Rx DSP architecture combining time domain and transform domain in which DBP is added. A difference from the Rx DSP architecture combining time domain and transform domain shown in FIG. 3 lies in that the DBP module is added. It should be understood that in the Rx DSP architecture combining time domain and transform domain shown in FIG. 3, only a linear impairment of an optical fiber is compensated for, for example, chromatic dispersion compensation. In the Rx DSP architecture combining time domain and transform domain in which the DBP module is added, the DBP module is used to implement nonlinear-effect compensation on a basis of a linear impairment, to increase a signal transmission distance.

Figure 7:
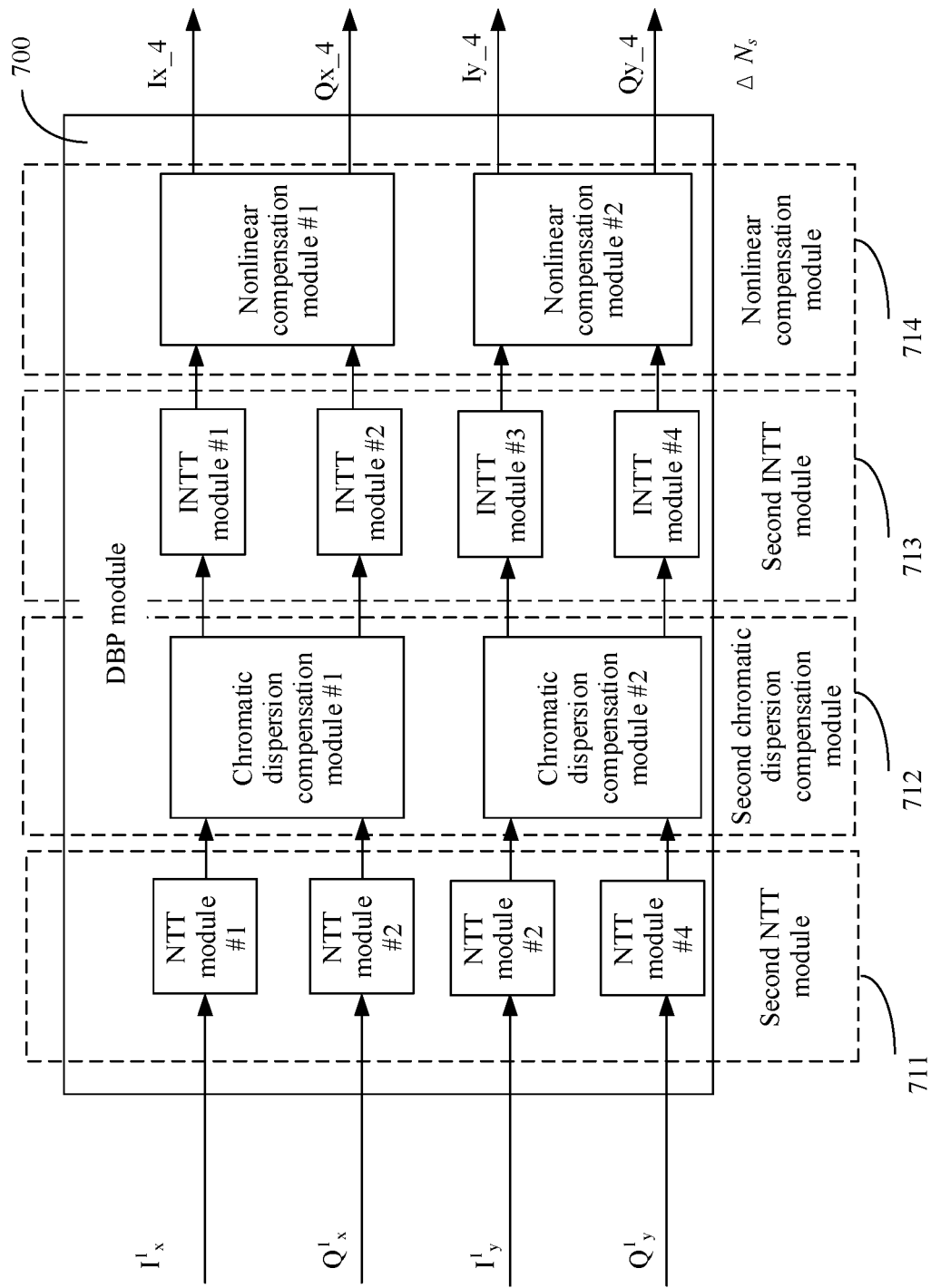
FIG. 7 is a schematic structural diagram of a DBP module according to an embodiment of the present disclosure.

FIG. 7 is a schematic structural diagram of a DBP module according to an embodiment of the present disclosure. The DBP module 700 includes:

a second NTT module 711, a second chromatic dispersion compensation module 712, a second INTT module 713, and a nonlinear compensation module 714, where a structure of the second chromatic dispersion compensation module 712 is shown in FIG. 4 (b), and is not described in detail herein.

It can be seen from the structural diagram of the DBP module shown in FIG. 7 that the performing DBP processing on $I^1_x$, $Q^1_x$, $I^1_y$, and $Q^1_y$ to obtain the real-number signals Ix_4, Qx_4, Iy_4, and Qy_4 shown in FIG. 5 and FIG. 6 specifically includes the following steps.

The second NTT module 711 includes an NTT module #1, an NTT module #2, an NTT module #3, and an NTT module #4. $I^1_x$, $Q^1_x$, $I^1_y$, and $Q^1_y$ are input to the NTT module #1, the NTT module #2, the NTT module #3, and the NTT module #4 respectively.

The NTT module #1, the NTT module #2, the NTT module #3, and the NTT module #4 perform NTT processing on $I^1_x$, $Q^1_x$, $I^1_y$, and $Q^1_y$ respectively, and output fourth real-number signals Ix_4', Qx_4', Iy_4', and Qy_4' to the second chromatic dispersion compensation module 712.

The second chromatic dispersion compensation module 712 includes a chromatic dispersion compensation module #1 and a chromatic dispersion compensation module #2. Ix_4' and Qx_4' are input to the chromatic dispersion compensation module #1, and chromatic dispersion compensation is performed in transform domain to obtain transform-domain fifth real-number signals Ix_4" and Qx_4". Iy_4' and Qy_4' are input to the chromatic dispersion compensation module #2, and chromatic dispersion compensation is performed in transform domain to obtain transform-domain fifth real-number signals Iy_4" and Qy_4".

The second INTT module 713 includes an INTT module #1, an INTT module #2, an INTT module #3, and an INTT module #4. Ix_4", Qx_4", Iy_4", and Qy_4" are input to the INTT module #1, the INTT module #2, the INTT module #3, and the INTT module #4 respectively.

The INTT module #1, the INTT module #2, the INTT module #3, and the INTT module #4 perform INTT processing on Ix_4", Qx_4", Iy_4", and Qy_4" respectively, and output time-domain ninth real-number signals Ix_4''', Qx_4''', Iy_4''', and Qy_4''' to the nonlinear compensation module 714.

The nonlinear compensation module 714 includes a nonlinear compensation module #1 and a nonlinear compensation module #2. Ix_4' and Qx_4' are input to the nonlinear compensation module #1, and nonlinear compensation is performed to obtain Ix_4 and Qx_4. Iy_4' and Qy_4' are input to the nonlinear compensation module #2, and nonlinear compensation is performed to obtain Iy_4 and Qy_4.

It should be noted that the foregoing processing procedure in the DBP module needs to be repeated for Ns times. To ensure performance, when a span of a link increases, a quantity Ns of DBP iterations also needs to be increased. Different DBP solutions are not limited herein. Depending on different power consumption required by scenarios, Ns may be set to be equal to a total span of a link, or single-step DBP may be set. In the DBP module in this embodiment of the present disclosure, no FFT module or IFFT module is used; instead, the NTT module and the INTT module are used. In this way, during a signal processing procedure of the DBP module, repeated Ns transformations do not cause error accumulation.

Figure 8:
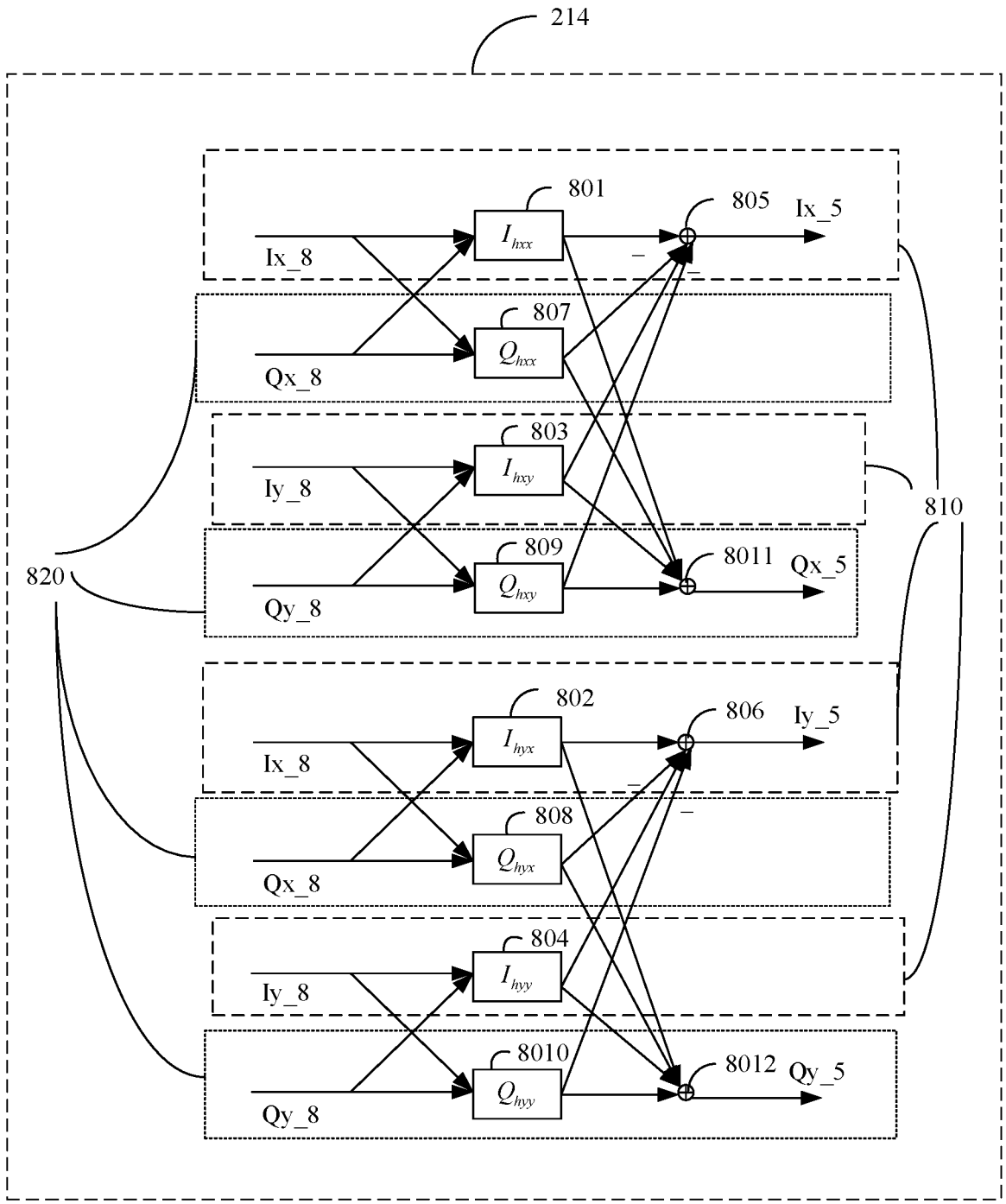
FIG. 8 (a) is a schematic structural diagram of a first polarization compensation module according to an embodiment of the present disclosure.
Figure 8:
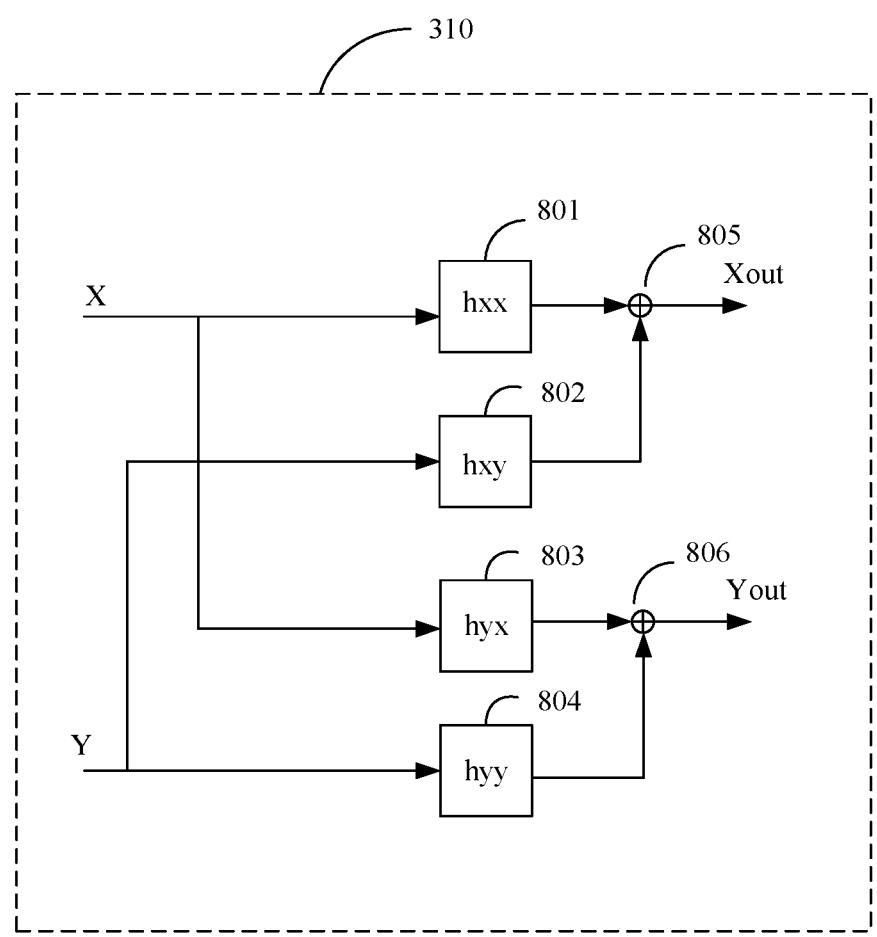

FIG. 8 (a) is a schematic structural diagram of a first polarization compensation module 214 according to an embodiment of the present disclosure. FIG. 8 (b) is a schematic structural diagram of a second polarization compensation module 310 according to an embodiment of this application.

It can be seen from FIG. 8 (a) that the first polarization compensation module 214 in this embodiment of the present disclosure includes a butterfly filter 810 and a butterfly filter 820. The butterfly filter 810 includes a filter 801, a filter 802, a filter 803, a filter 804, an adder 805, and an adder 806. The butterfly filter 820 includes a filter 807, a filter 808, a filter 809, a filter 8010, an adder 8011, and an adder 8012.

Output of the filter 801, output of the filter 807, output of the filter 803, and output of the filter 809 are negative. The foregoing four signals are input to the adder 805 to obtain a signal Ix_5 that has undergone chromatic dispersion compensation. The output of the filter 801, the output of the filter 807, the output of the filter 803, and the output of the filter 809 are input to the adder 805 to obtain a signal Qx_5 that has undergone chromatic dispersion compensation. Output of the filter 802, output of the filter 808, output of the filter 804, and output of the filter 8010 are negative. The foregoing four signals are input to the adder 806 to obtain a signal Iy_5 that has undergone chromatic dispersion compensation. The output of the filter 802, the output of the filter 808, the output of the filter 804, and the output of the filter 8010 are output to the adder 805 to obtain a signal Qy_5 that has undergone chromatic dispersion compensation.

A clock recovery module outputs four signals. The four signals Ix_2, Qx_2, Iy_2, and Qy_2 are input to a polarization compensation module. The polarization compensation module includes two butterfly filters. One butterfly filter represents a 2×2 two-input, two-output system. Two complex-number signals are input, and two complex-number signals are output. Because real-number signals are processed in NTT transformation, a polarization equalization part is a 4×4 four-input, four-output system.

The first butterfly filter 810 is for equalization and depolarization of I-path signals (including an x-polarization I-path signal Ix_2 and a y-polarization I-path signal Iy_2), and a transformation matrix is $$\begin{bmatrix} I_{hxx} & I_{hxy} \\ I_{hyx} & I_{hyy} \end{bmatrix}.$$

The second butterfly filter 820 is for Q-path signals (including an x-polarization Q-path signal Qx_2 and a y-polarization Q-path signal Qy_2), and a transformation matrix is $$\begin{bmatrix} Q_{hxx} & Q_{hxy} \\ Q_{hyx} & Q_{hyy} \end{bmatrix}.$$

The polarization compensation module outputs four real-number signals: Ix_5, Qx_5, Iy_5, and Qy_5. A process of performing polarization compensation by the first polarization compensation module 214 is described with reference to FIG. 8 (a).

Input signals of the first polarization compensation module 214 are four real-number signals: Ix_2, Qx_2, Iy_2, and Qy_2, which are a codirectional signal Ix_2 in a polarization direction x, a quadrature signal Qx_2 in the polarization direction x, a codirectional signal Iy_2 in a polarization direction y, and a quadrature signal Qy_2 in the polarization direction y, respectively.

Specifically, a multiplication result of Ix_2 and $I_{hxx}$ is input to the adder 805, a negative value of a multiplication result of Qx_2 and $Q_{hxx}$ is input to the adder 805, a multiplication result of Iy_2 and $I_{hxy}$ is input to the adder 805, a negative value of a multiplication result of Qy_2 and is input to the adder 805, and the adder 805 outputs a codirectional signal Ix_5 that is in the polarization direction x and that is obtained through polarization compensation.

A multiplication result of Ix_2 and $Q_{hxx}$ is input to the adder 8011, a negative value of a multiplication result of Qx_2 and $I_{hxx}$ is input to the adder 8011, a multiplication result of Iy_2 and $Q_{hxy}$ is input to the adder 8011, a multiplication result of Qy_2 and $I_{hxy}$ is input to the adder 8011, and the adder 8011 outputs a quadrature signal Qx_5 that is in the polarization direction x and that is obtained through polarization compensation.

A multiplication result of Ix_2 and $I_{hyx}$ is input to the adder 806, a negative value of a multiplication result of Qx_2 and $Q_{hyx}$ is input to the adder 806, a multiplication result of Iy_2 and $I_{hyy}$ is input to the adder 806, a negative value of a multiplication result of Qy_2 and $Q_{hyy}$ is input to the adder 806, and the adder 806 outputs a codirectional signal Iy_5 that is in the polarization direction y and that is obtained through polarization compensation.

A multiplication result of Ix_2 and $Q_{hyx}$ is input to the adder 8012, a multiplication result of Qx_2 and $I_{hxy}$ is input to the adder 8012, a multiplication result of Iy_2 and $Q_{hyy}$ is input to the adder 8012, a multiplication result of Qy_2 and $I_{hyy}$ is input to the adder 8012, and the adder 8012 outputs a quadrature signal Qy_5 that is in the polarization direction y and that is obtained through polarization compensation.

A process in which the output Ix_5, Qx_5, Iy_5, and Qy_5 of the first polarization compensation module 214 interact with an equalization matrix and the input signals Ix_2, Qx_2, Iy_2, and Qy_2 is described by using the following formula:

$$\begin{bmatrix} Ix\_5 \\ Qx\_5 \\ Iy\_5 \\ Qy\_5 \end{bmatrix} = \begin{bmatrix} I_{hxx} & -Q_{hxx} & I_{hxy} & -Q_{hxy} \\ Q_{hxx} & I_{hxx} & Q_{hxy} & I_{hxy} \\ I_{hyx} & -Q_{hyx} & I_{hyy} & -Q_{hyy} \\ Q_{hyx} & I_{hyx} & Q_{hyy} & I_{hyy} \end{bmatrix} \times \begin{bmatrix} Ix\_2 \\ Qx\_2 \\ Iy\_2 \\ Qy\_2 \end{bmatrix}$$

For example, the first polarization compensation module 214 further includes a coefficient update module 2141 (not shown in the figure). The coefficient update module 2141 is configured to update a coefficient of a filter included in the first polarization compensation module 214. In this embodiment, manners of updating equalization coefficient matrices $$\begin{bmatrix} I_{hxx} & I_{hxy} \\ I_{hyx} & I_{hyy} \end{bmatrix} \text{ and } \begin{bmatrix} Q_{hxx} & Q_{hxy} \\ Q_{hyx} & Q_{hyy} \end{bmatrix}$$

of a polarization compensation module include a blind update, an update with training, an update without decision feedback, an update with decision feedback, and the like. A manner of updating a coefficient of the polarization compensation module is not limited in this embodiment. Details are not described herein.

It can be seen from FIG. 8 (b) that the second polarization compensation module 310 in this embodiment includes 2×2 butterfly filters, and the butterfly filters include a filter 801, a filter 802, a filter 803, a fourth filter 804, an adder 805, and an adder 806.

Functions of the second polarization compensation module 310 include channel optical fiber effects such as equalization compensation, a differential group delay (DGD), and residual chromatic dispersion. An optical fiber effect may be described by using a 2×2 impairment matrix. An inverse matrix of the impairment matrix may be obtained by using different algorithms. Tap coefficients of a time-domain butterfly filter 108 are hxx, hxy, hyx, and hyy. X and Y signals are convolved with the tap coefficient matrices hxx, hxy, hyx, and hyy to obtain signals Xout and Yout that have undergone polarization impairment compensation. Common algorithms for calculating a tap coefficient matrix include a constant modulus algorithm (CMA), a least mean square (LMS), and various modified versions of the LMS or other forms such as a data-aided LMS.

The combination module 216 outputs a complex-number signal X in a polarization direction X, and the complex-number signal X is input to the filter 801 and the filter 803. The combination module 216 outputs a complex-number signal Yin a polarization direction Y, and the complex-number signal Y is input to the filter 802 and the filter 804. The filter 801 and the filter 803 provide output to the adder 805. The filter 802 and the filter 804 provide output to the adder 806.

hxx, hxy, hyx, and hyy in FIG. 8 (b) represent coefficients of the filter 801, the filter 802, the filter 803, and the filter 804 respectively.

It should be noted that although FIG. 8 (a) and FIG. 8 (b) are used as examples to describe the butterfly filters in the present disclosure, the butterfly filters shown in FIG. 8 (a) and FIG. 8 (b) are merely examples, and do not constitute any limitation on the protection scope of the present disclosure. The butterfly filters in the embodiments of the present disclosure should be understood in a broad sense, and a filter or a filter combination that can implement a deconvolution function may be referred to as a butterfly filter.

The Rx DSP provided in this embodiment may be further applied to a multi-mode transmission scenario. For example, the Rx DSP is applied to m transmission modes. In this case, the Rx DSP receives P real-number signals.

Figure 9:
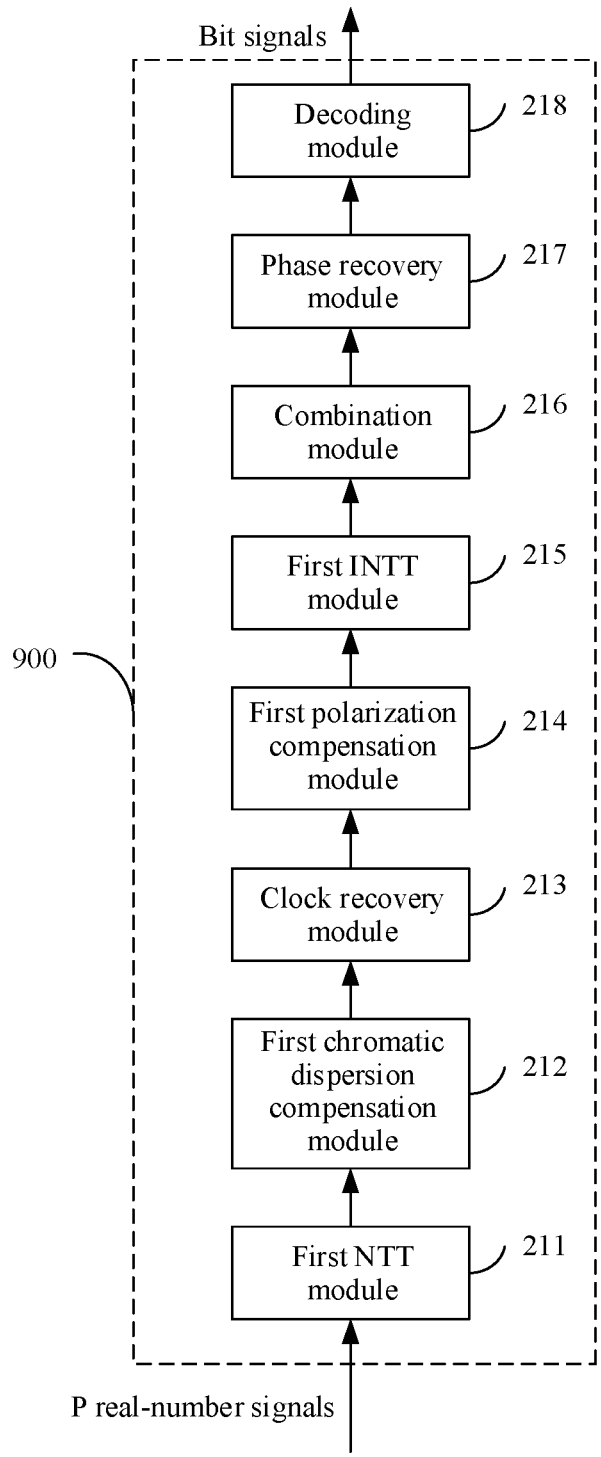
FIG. 9 (a) is a schematic diagram of an Rx DSP architecture in a multi-mode transmission scenario according to an embodiment of the present disclosure.
Figure 9:
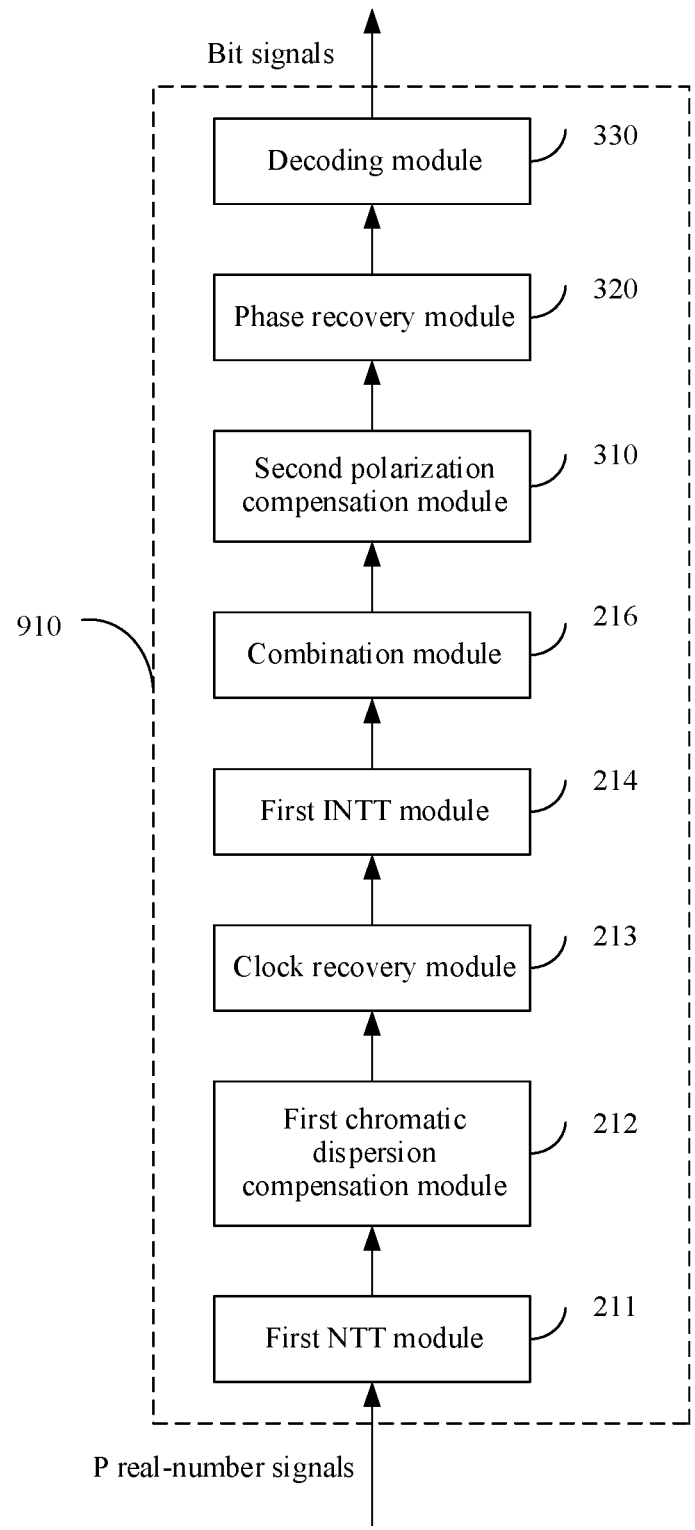
Figure 9:
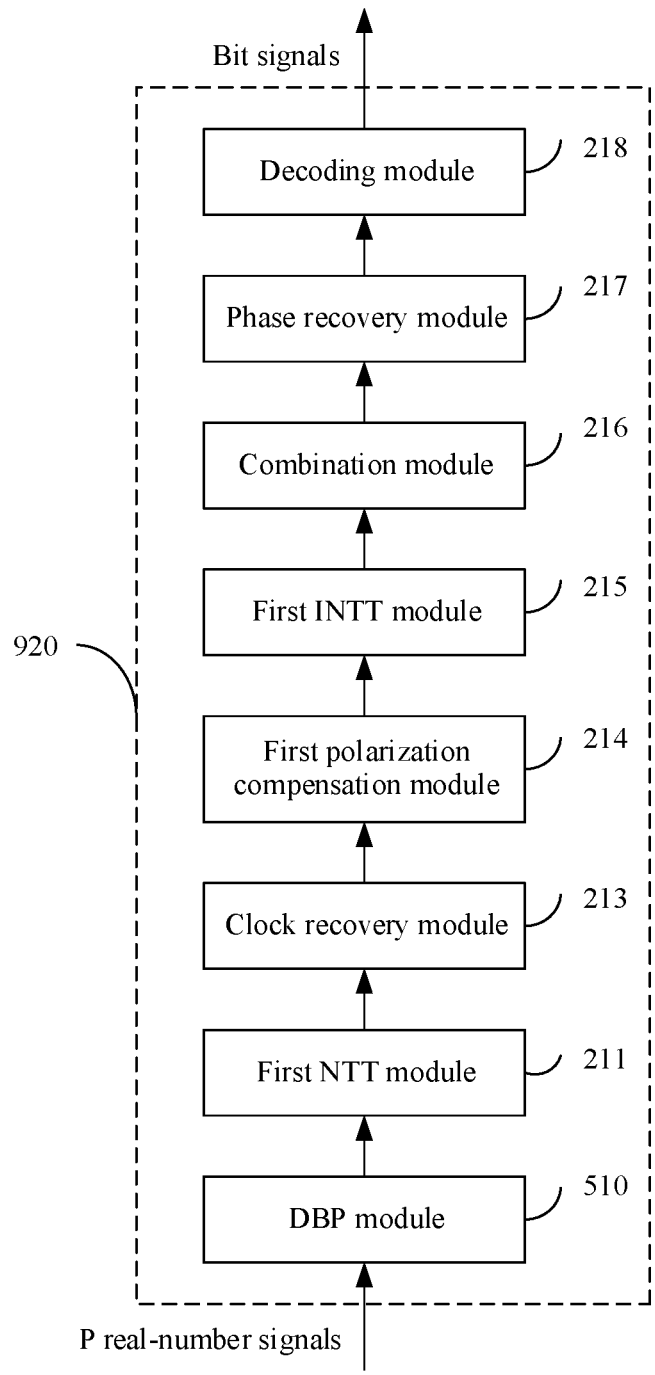
Figure 9:
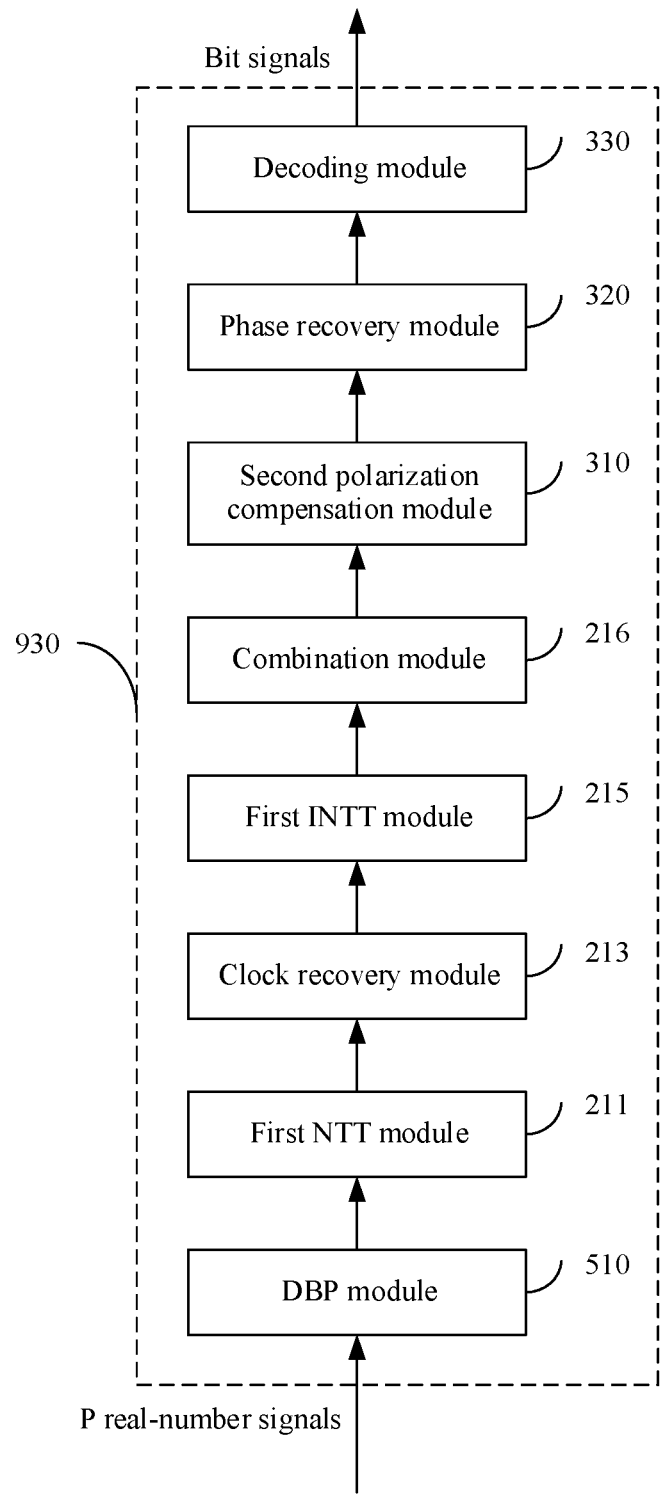
Figure 9:
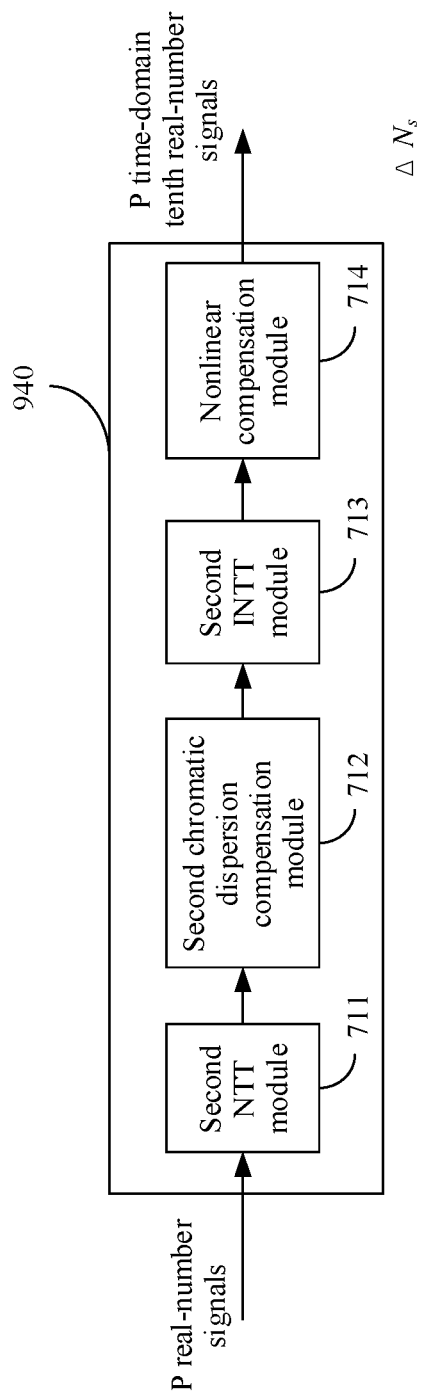

FIG. 9 (a) is a schematic diagram of an Rx DSP architecture in a multi-mode transmission scenario according to an embodiment of the present disclosure. The Rx DSP architecture 900 includes:

a first NTT module 211, a first chromatic dispersion compensation module 212, a clock recovery module 213, a first polarization compensation module 214, a first INTT module 215, a combination module 216, a phase recovery module 217, and a decoding module 218.

P real-number signals are input to the first NTT module 211. The first NTT module separately performs NTT processing on the P real-number signals, and outputs P transform-domain first real-number signals to the first chromatic dispersion compensation module 212.

Optionally, the P real-number signals are real-number signals obtained through conversion by an ADC. The P real-number signals include 4×m real-number signals in m transmission modes.

The first chromatic dispersion compensation module 212 separately performs chromatic dispersion compensation on the P transform-domain first real-number signals, and outputs P transform-domain third real-number signals to the clock recovery module 213.

The clock recovery module 213 separately performs clock recovery on the P transform-domain third real-number signals, and outputs P transform-domain second real-number signals to the first polarization compensation module 214.

The first polarization compensation module 214 performs polarization compensation processing on the P transform-domain second real-number signals, and outputs P transform-domain sixth real-number signals to the first INTT module 215.

The first INTT module 215 separately performs INTT processing on the P transform-domain sixth real-number signals, and outputs P time-domain seventh real-number signals to the combination module 216.

The combination module 216 combines the P time-domain seventh real-number signals, and outputs m complex-number signals X and m complex-number signals Y to the phase recovery module 217 and the decoding module 218.

The phase recovery module 217 and the decoding module 218 perform phase recovery and decoding processing on the m complex-number signals X and the m complex-number signals Y to obtain recovered bit signals.

FIG. 9 (b) is a schematic diagram of an Rx DSP architecture in another multi-mode transmission scenario according to an embodiment of the present disclosure. The Rx DSP architecture 910 includes:

a first NTT module 211, a first chromatic dispersion compensation module 212, a clock recovery module 213, a second polarization compensation module 310, a first INTT module 214, a combination module 216, a phase recovery module 320, and a decoding module 330.

Modules before clock recovery in the architecture 910 are the same as those in the architecture 900. A difference lies in that a signal output by the clock recovery module is first processed by the INTT module and combined by the combination module, and then input to the second polarization compensation module 108. A process before the clock recovery is not described again.

The first INTT module 214 separately performs INTT processing on the P transform-domain second real-number signals, and outputs P time-domain eighth real-number signals to the combination module 216. The combination module 216 combines the P time-domain eighth real-number signals, and outputs m complex-number signals X and m complex-number signals Y to the second polarization compensation module 310.

The second polarization compensation module 310 performs polarization compensation processing on the m complex-number signals X and the m complex-number signals Y, and outputs m time-domain complex-number signals X and m time-domain complex-number signals Y obtained through polarization compensation to the phase recovery module 320 and the decoding module 330. The second polarization compensation module 310 further includes a coefficient update module 311 (not shown in the figure). The coefficient update module 311 is configured to update a coefficient of a filter included in the second polarization compensation module 310.

The phase recovery module 320 and the decoding module 330 perform phase recovery and decoding processing on the m complex-number signals X and the m complex-number signals Y to obtain recovered bit signals.

FIG. 9 (c) is a schematic diagram of an Rx DSP architecture in still another multi-mode transmission scenario according to an embodiment of the present disclosure. The Rx DSP architecture 920 includes:

a DBP module 510, a first NTT module 211, a clock recovery module 213, a first polarization compensation module 214, a first INTT module 215, a combination module 216, a phase recovery module 217, and a decoding module 218.

An architecture after the first polarization compensation module 214 in the Rx DSP architecture 920 is the same as that in the Rx DSP architecture 900. A difference lies in that a signal undergoes DBP processing before polarization compensation. Because the DBP module 510 has a chromatic dispersion compensation function, a process after the DBP module may not require the chromatic dispersion compensation module 212.

P real-number signals are input to the DBP module 510, DBP processing is performed, and P time-domain tenth real-number signals are output to the first NTT module 211.

The first NTT module 211 separately performs NTT processing on the P time-domain tenth real-number signals, and outputs P transform-domain first real-number signals to the clock recovery module 213.

The clock recovery module 213 separately performs clock recovery processing on the P transform-domain first real-number signals, and outputs P transform-domain second real-number signals to the first polarization compensation module 214.

For a process after the clock recovery module 213, refer to the embodiment shown in FIG. 9 (a).

FIG. 9 (d) is a schematic diagram of an Rx DSP architecture in still another multi-mode transmission scenario according to an embodiment of the present disclosure. The Rx DSP architecture 930 includes:

a DBP module 510, a first NTT module 211, a clock recovery module 213, a second polarization compensation module 310, a first INTT module 215, a combination module 216, a phase recovery module 320, and a decoding module 330.

An architecture after the second polarization compensation module 310 in the Rx DSP architecture 930 is the same as that in the Rx DSP architecture 910. An architecture before the second polarization compensation module 310 is the same as that in the Rx DSP architecture 920. To be specific, a received signal obtained through conversion by an ADC first undergoes DBP processing. For a process before the DBP processing and clock recovery, refer to the embodiment shown in FIG. 9 (c). For a process after the clock recovery module 213, refer to the embodiment shown in FIG. 9 (b).

For example, the DBP module 510 shown in FIG. 9 (c) and FIG. 9 (d) is shown in FIG. 9 (e). FIG. 9 (e) is a schematic structural diagram of another DBP module according to an embodiment of the present disclosure. The DBP module 940 includes:

a second NTT module 711, a second chromatic dispersion compensation module 712, a second INTT module 713, and a nonlinear compensation module 714.

That P real-number signals are input to the DBP module 510, and DBP processing is performed to obtain P time-domain tenth real-number signals specifically includes the following steps.

The P real-number signals are respectively input to P second NTT modules 711, NTT processing is performed, and P transform-domain fourth real-number signals are output to the second chromatic dispersion compensation module 712.

The second chromatic dispersion compensation module 712 performs chromatic dispersion compensation processing on the P transform-domain fourth real-number signals, and outputs P transform-domain fifth real-number signals to the second INTT module 713.

The second INTT module 713 performs INTT processing on the P transform-domain fifth real-number signals, and outputs P time-domain ninth real-number signals to the nonlinear compensation module 714.

The nonlinear compensation module 714 performs nonlinear compensation on the P time-domain ninth real-number signals to obtain the P time-domain tenth real-number signals.

Specifically, compared with performing signal processing by using the FFT module and the IFFT module, performing signal processing by using the NTT module and the INTT module has the following advantages.

(1) When signal processing is performed based on the NTT module and the INTT module, complexity of the Rx DSP architecture is reduced.

When signal processing is performed based on the FFT module and the IFFT module, during a signal transmission process, power consumption of merely chromatic dispersion compensation accounts for half of total power consumption of Rx DSP, and complexity of N-point FFT is proportional to N log 2N multiplications. Depending on different data bit widths of operations, complexity of a multiplication is equal to several times to dozens of times of that of an addition.

However, complexity of signal processing performed based on the NTT module and the INTT module is proportional to 2N log 2N additions. Depending on different data bit widths and different quantities N of transformation points, complexity of signal processing performed based on the NTT module and the INTT module is reduced to different degrees. For example, if a quantity of transformation points is 256, power consumption of NTT is reduced to approximately ¼ of that of FFT.

(2) When signal processing is performed based on the NTT module and the INTT module, a transformation matrix has no truncation error or fixed-point penalty.

When signal processing is performed based on the FFT module and the IFFT module, because a transformation core of FFT is an exponential function, a truncation error cannot be accurately expressed on a binary computer. In addition, a bit width of a transformation matrix is not fixed, causing a fixed-point penalty.

However, in signal processing performed based on the NTT module and the INTT module, because a transformation core of NTT is an integer and the transformation core is usually 2 or a power of 2, the transformation core can be accurately expressed in a memory. In addition, a bit width of a transformation matrix is fixed, without a fixed-point penalty.

(3) When signal processing is performed based on the NTT module and the INTT module, no error accumulates.

A truncation error and a fixed-point penalty in a single FFT or IFFT transformation repeatedly accumulate during DBP propagation. As a result, a final result error is larger.

However, there is no truncation error or fixed-point penalty in a single NTT or INTT transformation. Therefore, repeated Ns transformations do not cause error accumulation.

(4) When signal processing is performed based on the NTT module and the INTT module, storage can be reduced.

A transformation core of NTT is 2, and a transformation matrix includes 2 or a power of 2. In a binary system, a number is multiplied by a power of 2 only through shifting. Therefore, no huge transformation matrix needs to be stored in a DSP process, and only the transformation core needs to be stored.

Figure 10:
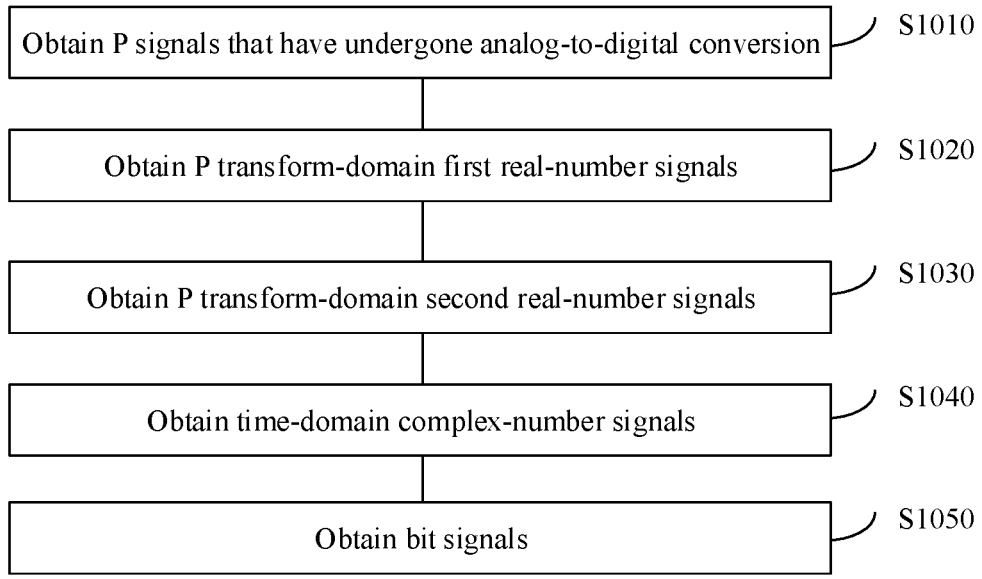
FIG. 10 (a) is a schematic flowchart of a signal processing method according to an embodiment of the present disclosure.
Figure 10:
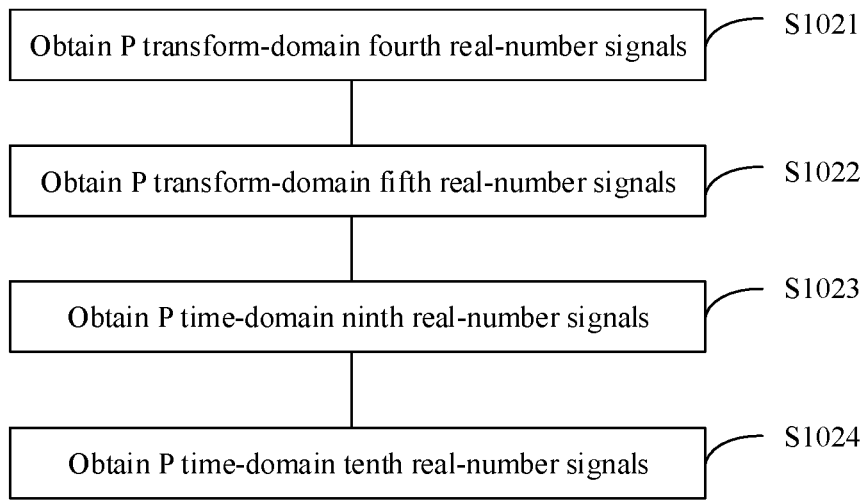
Figure 10:
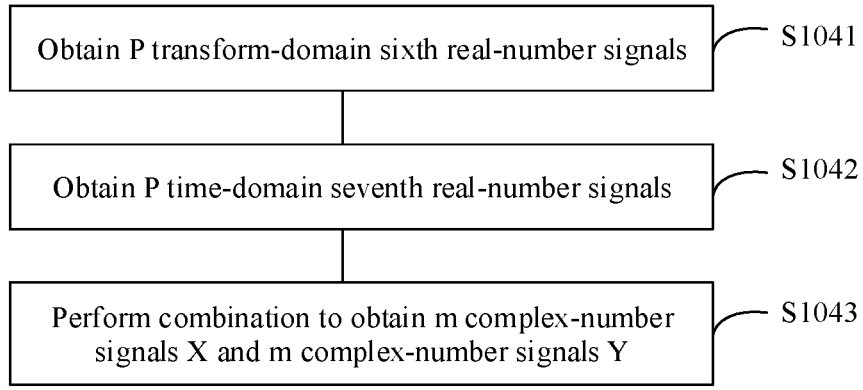
Figure 10:
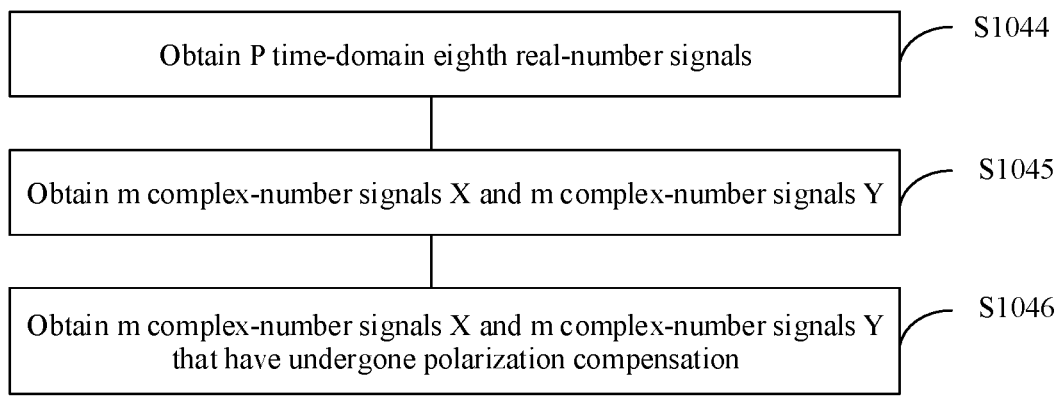

FIG. 10 (a) is a schematic flowchart of a signal processing method according to an embodiment of the present disclosure. The following steps S1010 to S1050 are included.

S1010. Obtain P real-number signals.

For example, the P real-number signals include real-number signals that are in two polarization directions and that correspond to each of m modes. When m is equal to 1, it indicates single-mode transmission; or when m is greater than 1, it indicates multi-mode transmission. m and P are positive integers.

S1020. Obtain P transform-domain first real-number signals.

At least NTT processing is performed on the P real-number signals to obtain the P transform-domain first real-number signals. The following two possible implementations are included.

Implementation 1.1: Perform NTT processing on the P real-number signals to obtain the P transform-domain first real-number signals.

Implementation 1.2: Sequentially perform DBP processing and NTT processing on the P real-number signals to obtain the P transform-domain first real-number signals.

In the implementation 1.2, DBP processing is first performed on the P real-number signals to obtain P time-domain tenth real-number signals, and then NTT processing is performed on the P time-domain tenth real-number signals to obtain the P transform-domain first real-number signals.

The performing NTT processing on the P real-number signals in the implementation 1.1, and the performing NTT processing on the P time-domain tenth real-number signals that are obtained by performing DBP processing on the P real-number signals in the implementation 1.2 may be collectively referred to as performing NTT processing on P input signals. In other words, in this embodiment of the present disclosure, the P input signals include the P real-number signals, or the P time-domain tenth real-number signals that are obtained by performing DBP processing on the P real-number signals.

For ease of understanding, a process of performing DBP processing on the P real-number signals to obtain the P time-domain tenth real-number signals is briefly described with reference to FIG. 10 (b). FIG. 10 (b) is a schematic flowchart of DBP processing according to an embodiment of the present disclosure. The following steps S1021 to S1024 are included.

S1021. Obtain P transform-domain fourth real-number signals.

NTT processing is performed on P real-number signals to obtain the P transform-domain fourth real-number signals.

S1022. Obtain P transform-domain fifth real-number signals.

Chromatic dispersion compensation is performed on the P transform-domain fourth real-number signals in transform domain to obtain the P transform-domain fifth real-number signals.

S1023. Obtain P time-domain ninth real-number signals.

INTT processing is performed on the P transform-domain fifth real-number signals to obtain the P time-domain ninth real-number signals.

S1024. Obtain P time-domain tenth real-number signals.

Nonlinear compensation is performed on the P time-domain ninth real-number signals to obtain the P time-domain tenth real-number signals.

S1030. Obtain P transform-domain second real-number signals.

At least clock recovery processing is performed on the P transform-domain first real-number signals to obtain the P transform-domain second real-number signals. Corresponding to the two possibilities in step S1020, the following two possible implementations are included.

Implementation 2.1: This corresponds to the implementation 1.1 in step S1020. A processing procedure includes the following steps.

First, perform chromatic dispersion compensation on the P transform-domain first real-number signals to obtain P transform-domain third real-number signals.

Then, separately perform clock recovery on the P transform-domain third real-number signals to obtain the P transform-domain second real-number signals.

The performing chromatic dispersion compensation on the P transform-domain first real-number signals to obtain P transform-domain third real-number signals specifically includes the following steps:

First, determine a chromatic dispersion impulse response $I_h(t)$ corresponding to an in-phase real-number signal and a chromatic dispersion impulse response $Q_h(t)$ corresponding to a quadrature real-number signal, and perform NTT to obtain a transform-domain chromatic dispersion equalization function $I_h(w)$ corresponding to the in-phase real-number signal and a transform-domain chromatic dispersion equalization function $Q_h(w)$ corresponding to the quadrature real-number signal.

Then, determine 2×m transform-domain third real-number signals that are in the P transform-domain third real-number signals and that are in a first polarization direction based on $I_h(w)$, $Q_h(w)$, and an in-phase real-number signal and a quadrature real-number signal that are in the P transform-domain first real-number signals and that are in the first polarization direction, and determine 2×m transform-domain third real-number signals that are in the P transform-domain third real-number signals and that are in a second polarization direction based on $I_h(w)$, $Q_h(w)$, and an in-phase real-number signal and a quadrature real-number signal that are in the P transform-domain first real-number signals and that are in the second polarization direction.

Specifically, the transform-domain third real-number signals obtained through chromatic dispersion compensation and the transform-domain first real-number signals that have not undergone chromatic dispersion compensation meet the following requirements:

$$I'_x(w) = I_x(w) \cdot I_h(w) - Q_x(w) \cdot Q_h(w);$$

$$Q'_x(w) = Q_x(w) \cdot I_h(w) + I_x(w) \cdot Q_h(w);$$

$$I'_y(w) = I_y(w) \cdot I_h(w) - Q_y(w) \cdot Q_h(w); \text{ and}$$

$$Q'_y(w) = Q_y(w) \cdot I_h(w) + I_y(w) \cdot Q_h(w), \text{ where}$$

$I_x(w)$ represents an in-phase real-number signal that is in the transform-domain first real-number signals and that is in the first polarization direction, $Q_x(w)$ represents a quadrature real-number signal that is in the transform-domain first real-number signals and that is in the first polarization direction, $I_y(w)$ represents an in-phase real-number signal that is in the transform-domain first real-number signals and that is in the second polarization direction, $Q_y(w)$ represents a quadrature real-number signal that is in the transform-domain first real-number signals and that is in the second polarization direction, $I'_x(w)$ represents an in-phase real-number signal that is in the transform-domain third real-number signals and that is in the first polarization direction, $Q'_x(w)$ represents a quadrature real-number signal that is in the transform-domain third real-number signals and that is in the first polarization direction, $I'_y(w)$ represents an in-phase real-number signal that is in the transform-domain third real-number signals and that is in the second polarization direction, and $Q'_y(w)$ represents a quadrature real-number signal that is in the transform-domain third real-number signals and that is in the second polarization direction.

Implementation 2.2:

This corresponds to the implementation 1.2 in step S1020. A processing procedure includes the following step:

Separately perform clock recovery on the P transform-domain first real-number signals to obtain the P transform-domain second real-number signals.

S1040. Obtain time-domain complex-number signals.

At least polarization compensation processing and INTT processing are performed on the P transform-domain second real-number signals to obtain m time-domain complex-number signals X and m time-domain complex-number signals Y. The following two possible implementations are included.

Implementation 3.1: Sequentially perform polarization compensation processing, INTT processing, and combination processing on the P transform-domain second real-number signals to obtain the m time-domain complex-number signals X and the m time-domain complex-number signals Y. FIG. 10 (c) is a schematic flowchart of obtaining a time-domain complex-number signal according to an embodiment of the present disclosure. The following steps S1041 to S1043 are included.

S1041. Obtain P transform-domain sixth real-number signals.

Polarization compensation is performed on P transform-domain second real-number signals to obtain the P transform-domain sixth real-number signals.

S1042. Obtain P time-domain seventh real-number signals.

INTT processing is separately performed on the P transform-domain sixth real-number signals to obtain the P time-domain seventh real-number signals.

S1043. Perform combination to obtain m complex-number signals X and m complex-number signals Y.

Every two of 2×m time-domain seventh real-number signals that are in the P time-domain seventh real-number signals and that are in a first polarization direction are combined to obtain the m time-domain complex-number signals X in the first polarization direction.

Every two of 2×m time-domain seventh real-number signals that are in the P time-domain seventh real-number signals and that are in a second polarization direction are combined to obtain the m time-domain complex-number signals Y in the second polarization direction.

Implementation 3.2: Sequentially perform INTT processing, combination processing, and polarization compensation processing on the P transform-domain second real-number signals. FIG. 10 (d) is another schematic flowchart of obtaining a time-domain complex-number signal according to an embodiment of the present disclosure. The following steps S1044 to S1046 are included.

S1044. Obtain P time-domain eighth real-number signals.

INTT processing is performed on P transform-domain second real-number signals to obtain the P time-domain eighth real-number signals.

S1045. Obtain m complex-number signals X and m complex-number signals Y.

Every two of 2×m time-domain eighth real-number signals that are in the P time-domain eighth real-number signals and that are in a first polarization direction are combined to obtain the m time-domain complex-number signals X in the first polarization direction.

Every two of 2×m time-domain eighth real-number signals that are in the P time-domain eighth real-number signals and that are in a second polarization direction are combined to obtain the m time-domain complex-number signals Y in the second polarization direction.

S1046. Obtain m complex-number signals X and m complex-number signals Y that have undergone polarization compensation.

Polarization compensation is performed on the m time-domain complex-number signals X in the first polarization direction and the m time-domain complex-number signals Y in the second polarization direction to obtain the m time-domain complex-number signals X and the m time-domain complex-number signals Y that have undergone the polarization compensation.

S1050. Obtain bit signals.

To obtain the recovered bit signals, phase recovery and decoding need to be performed on the time-domain complex-number signals obtained in S1040.

First, phase recovery is performed on the m time-domain complex-number signals X and the m time-domain complex-number signals Y to obtain m time-domain complex-number signals X and m time-domain complex-number signals Y that have undergone the phase recovery.

Then, the m time-domain complex-number signals X and the m time-domain complex-number signals Y that are obtained through phase recovery are decoded to obtain m time-domain complex-number signals X and m time-domain complex-number signals Y that have been decoded.

It should be noted that how to perform phase recovery and decoding on the time-domain complex-number signals is not limited in this embodiment of the present disclosure.

Refer to a current process of performing phase recovery and decoding on an electrical signal by a polarization multiplexing coherent receiver.

An embodiment of the present disclosure further provides a coherent receiver, including a polarization beam splitter, a frequency mixer, a photoelectric detector, an analog-to-digital converter, and the Rx DSP shown in FIG. 9 (a), FIG. 9 (b), FIG. 9 (c), or FIG. 9 (d). The polarization beam splitter, the frequency mixer, the photoelectric detector, and the analog-to-digital converter are similar to those shown in FIG. 1 (a) and FIG. 1 (b). Details are not described herein again.

Figure 11:
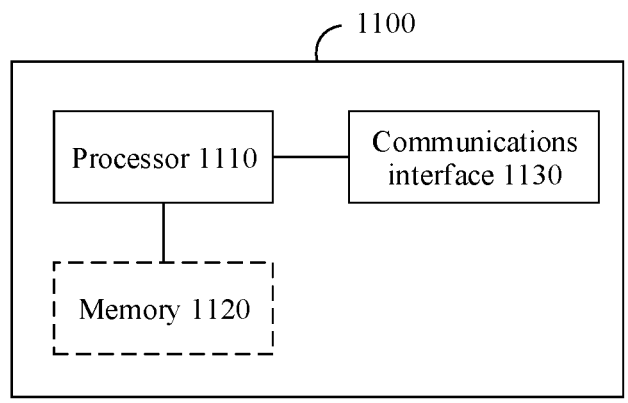
FIG. 11 is a schematic diagram of a chip according to an embodiment of the present disclosure.

An embodiment of the present disclosure further provides a chip. FIG. 11 is a schematic diagram of a chip 1100 according to the present disclosure. The chip 1100 includes a processor 1110, a memory 1120, and a communications interface 1130. The processor 1110 is coupled to the memory 1120. The memory 1120 is configured to store a computer program or an instruction and/or data. The processor 1110 is configured to execute the computer program or the instruction and/or the data stored in the memory 1120, so that the method in the foregoing method embodiment is performed.

In a possible implementation, the chip shown in FIG. 11 may be a signal processing apparatus including a processor 1110 and a communications interface 1130. The processor 1110 is coupled to a memory by using the communications interface 1130, and the processor 1110 is configured to perform the method in the foregoing method embodiment.

It should be understood that the foregoing embodiments are merely examples for describing the signal processing procedure provided in the present disclosure, and do not constitute any limitation on the protection scope of the present disclosure. Other simple variations of the Rx DSP architecture all fall within the protection scope of the present disclosure. A difference between the Rx DSP architecture in the present disclosure and an existing Rx DSP architecture lies in that an FFT module and an IFFT module are not used for signal processing, but an NTT module and an INTT module are used.

It should be further understood that, in the embodiments of the present disclosure, unless otherwise specified or in case of a logical conflict, terms and/or descriptions in different embodiments may be consistent and may be mutually referenced. Technical features in different embodiments may be combined based on an internal logical relationship of the technical features to form a new embodiment.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

What is claimed is:

1. A signal processing method applied to a coherent receiver, wherein the method comprises:
    obtaining P real-number signals;
    performing at least number theoretic transform (NTT) processing on the P real-number signals to obtain P transform-domain first real-number signals;
    performing at least clock recovery on the P transform-domain first real-number signals to obtain P transform-domain second real-number signals;
    performing at least polarization compensation and inverse number theoretic transform (INTT) processing on the P transform-domain second real-number signals to obtain m time-domain complex-number signals X and m time-domain complex-number signals Y; and
    performing phase recovery and decoding on the m time-domain complex-number signals X and the m time-domain complex-number signals Y to obtain bit signals, wherein m and P are positive integers.

2. The method according to claim 1, wherein the P real-number signals comprise 4×m real-number signals in m transmission modes, and
    in response to m being equal to 1, a single-mode transmission is indicated, or
    in response to m being greater than 1, a multi-mode transmission is indicated.

3. The method according to claim 1, wherein the performing the at least clock recovery on the P transform-domain first real-number signals to obtain the P transform-domain second real-number signals comprises:
    performing chromatic dispersion compensation on the P transform-domain first real-number signals to obtain P transform-domain third real-number signals; and
    performing clock recovery on the P transform-domain third real-number signals to obtain the P transform-domain second real-number signals.

4. The method according to claim 3, wherein the P real-number signals comprise an in-phase real-number signal $I^m_x$ and a quadrature real-number signal $Q^m_x$ in a first polarization direction, and an in-phase real-number signal $I^m_y$ and a quadrature real-number signal $Q^m_y$ in a second polarization direction; and
    wherein the performing the chromatic dispersion compensation on the P transform-domain first real-number signals to obtain the P transform-domain third real-number signals comprises:
    performing NTT processing on a chromatic dispersion impulse response $I_h(t)$ corresponding to an in-phase real-number signal and a chromatic dispersion impulse response $Q_h(t)$ corresponding to a quadrature real-number signal, to obtain a transform-domain chromatic dispersion equalization function $I_h(w)$ corresponding to the in-phase real-number signal and a transform-domain chromatic dispersion equalization function $Q_h(w)$ corresponding to the quadrature real-number signal;
    determining 2×m transform-domain third real-number signals that are in the P transform-domain third real-number signals and that are in the first polarization direction based on $I_h(w)$, $Q_h(w)$, and an in-phase real-number signal $I_x(w)$ and a quadrature real-number signal $Q_x(w)$ that are in the P transform-domain first real-number signals and that are in the first polarization direction; and
    determining 2×m transform-domain third real-number signals that are in the P transform-domain third real-number signals and that are in the second polarization direction based on $I_h(w)$, $Q_h(w)$, and an in-phase real-number signal $I_y(w)$ and a quadrature real-number signal $Q_y(w)$ that are in the P transform-domain first real-number signals and that are in the second polarization direction.

5. The method according to claim 4, wherein the transform-domain third real-number signals obtained through the chromatic dispersion compensation and the transform-domain first real-number signals meet the following requirements:

$$I'_x(w)=I_x(w)\cdot I_h(w)-Q_x(w)\cdot Q_h(w);$$

$$Q'_x(w)=Q_x(w)\cdot I_h(w)+I_x(w)\cdot Q_h(w);$$

$$I'_y(w)=I_y(w)\cdot I_h(w)-Q_y(w)\cdot Q_h(w); \text{ and}$$

$$Q'_y(w)=Q_y(w)\cdot I_h(w)+I_y(w)\cdot Q_h(w), \text{ wherein}$$

$I_x(w)$ represents an in-phase real-number signal that is in the transform-domain first real-number signals and that is in the first polarization direction, $Q_x(w)$ represents a quadrature real-number signal that is in the transform-domain first real-number signals and that is in the first polarization direction, $I_y(w)$ represents an in-phase real-number signal that is in the transform-domain first real-number signals and that is in the second polarization direction, $Q_y(w)$ represents a quadrature real-number signal that is in the transform-domain first real-number signals and that is in the second polarization direction, $I'_x(w)$ represents an in-phase real-number signal that is in the transform-domain third real-number signals and that is in the first polarization direction, $Q'_x(w)$ represents a quadrature real-number signal that is in the transform-domain third real-number signals and that is in the first polarization direction, $T'_y(w)$ represents an in-phase real-number signal that is in the transform-domain third real-number signals and that is in the second polarization direction, and $Q'_y(w)$ represents a quadrature real-number signal that is in the transform-domain third real-number signals and that is in the second polarization direction.

6. The method according to claim 1, wherein the performing the at least NTT processing on the P real-number signals to obtain the P transform-domain first real-number signals comprises:
performing digital back propagation (DBP) processing on the P real-number signals to obtain P time-domain tenth real-number signals; and
separately performing NTT processing on the P time-domain tenth real-number signals to obtain the P transform-domain first real-number signals.

7. The method according to claim 6, wherein the performing the DBP processing on the P real-number signals to obtain the P time-domain tenth real-number signals comprises:
performing NTT processing on the P real-number signals to obtain P transform-domain fourth real-number signals;
performing, in transform domain, chromatic dispersion compensation on the P transform-domain fourth real-number signals to obtain P transform-domain fifth real-number signals;
performing INTT processing on the P transform-domain fifth real-number signals to obtain P time-domain ninth real-number signals; and
performing nonlinear compensation on the P time-domain ninth real-number signals to obtain the P time-domain tenth real-number signals.

8. The method according to claim 7, wherein the performing the at least polarization compensation and INTT processing on the P transform-domain second real-number signals to obtain the m time-domain complex-number signals X and the m time-domain complex-number signals Y comprises:
performing polarization compensation on the P transform-domain second real-number signals to obtain P transform-domain sixth real-number signals;
performing INTT processing on the P transform-domain sixth real-number signals to obtain P time-domain seventh real-number signals; and
combining every two of 2×m time-domain seventh real-number signals that are in the P time-domain seventh real-number signals and that are in the first polarization direction to obtain m time-domain complex-number signals X in the first polarization direction, and combining every two of 2×m time-domain seventh real-number signals that are in the P time-domain seventh real-number signals and that are in the second polarization direction to obtain m time-domain complex-number signals Y in the second polarization direction.

9. The method according to claim 8, wherein the performing the polarization compensation on the P transform-domain second real-number signals to obtain the P transform-domain sixth real-number signals comprises:
performing equalization and depolarization on 2×m transform-domain second real-number signals that are in the P transform-domain second real-number signals and that are in the first polarization direction to obtain 2×m transform-domain sixth real-number signals that are in the P transform-domain sixth real-number signals and that are in the first polarization direction; and
performing equalization and depolarization on 2×m transform-domain second real-number signals that are in the P transform-domain second real-number signals and that are in the second polarization direction to obtain 2×m transform-domain sixth real-number signals that are in the P transform-domain sixth real-number signals and that are in the second polarization direction.

10. The method according to claim 7, wherein the performing the at least polarization compensation and INTT processing on the P transform-domain second real-number signals to obtain the m time-domain complex-number signals X and the m time-domain complex-number signals Y comprises:
performing INTT processing on the P transform-domain second real-number signals to obtain P time-domain eighth real-number signals;
combining every two of 2×m time-domain eighth real-number signals that are in the P time-domain eighth real-number signals and that are in the first polarization direction to obtain m time-domain complex-number signals X in the first polarization direction, and combining every two of 2×m time-domain eighth real-number signals that are in the P time-domain eighth real-number signals and that are in the second polarization direction to obtain m time-domain complex-number signals Y in the second polarization direction; and
performing time-domain polarization compensation on the m time-domain complex-number signals X in the first polarization direction and the m time-domain complex-number signals Y in the second polarization direction to obtain m time-domain complex-number signals X and m time-domain complex-number signals Y that have undergone the polarization compensation.

11. A coherent receiver, comprising:
a signal processing apparatus-, a polarization beam splitter, a frequency mixer, a photoelectric detector, and an analog-to-digital converter, wherein:
the signal processing apparatus is configured to:
perform number theoretic transform (NTT) processing on P input signals to obtain P transform-domain first real-number signals;
perform clock recovery on the P transform-domain first real-number signals or P transform-domain first real-number signals obtained through chromatic dispersion compensation, to obtain P transform-domain second real-number signals;
process the P transform-domain second real-number signals to obtain m time-domain complex-number signals X and m time-domain complex-number signals Y; and
process the m time-domain complex-number signals X and the m time-domain complex-number signals Y to obtain bit signals, wherein m and P are positive integers;
the polarization beam splitter is configured to obtain signals in two polarization directions,
the frequency mixer is configured to perform frequency mixing processing on signals in a same polarization direction among the signals in the two polarization directions that are output by the polarization beam splitter, the photoelectric detector is configured to convert strength of an optical signal output by the frequency mixer into strength of an electrical signal, and the analog-to-digital converter is configured to perform analog-to-digital conversion on a signal output by the photoelectric detector.

12. A chip, comprising; a communications interface, a memory, and a processor, wherein the memory is coupled with the processor and stores processor-executable instructions, and the processor is configured to execute the processor-executable instructions to facilitate the following:

performing number theoretic transform (NTT) processing on P input signals to obtain P transform-domain first real-number signals;

performing clock recovery on the P transform-domain first real-number signals or P transform-domain first real-number signals obtained through chromatic dispersion compensation, to obtain P transform-domain second real-number signals;

processing the P transform-domain second real-number signals to obtain m time-domain complex-number signals X and m time-domain complex-number signals Y; and processing the m time-domain complex-number signals X and the m time-domain complex-number signals Y to obtain bit signals, wherein m and P are positive integers.

13. The chip according to claim 12, wherein the P input signals comprise 4×m real-number signals in m transmission modes, and in response to m being equal to 1, a single-mode transmission is indicated, or in response to m being greater than 1, a multi-mode transmission is indicated.

14. The chip according to claim 12, wherein the processor is further configured to execute the processor-executable instructions to facilitate:

performing chromatic dispersion compensation on the P transform-domain first real-number signals to obtain P transform-domain third real-number signals, and performing clock recovery on the third real-number signal to obtain the P transform-domain second real-number signals.

15. The chip according to claim 14, wherein the P input signals comprise an in-phase real-number signal $I'''_x$ and a quadrature real-number signal $Q'''_x$ in a first polarization direction, and an in-phase real-number signal $I'''_y$ and a quadrature real-number signal $Q'''_y$ in a second polarization direction; and wherein the performing the chromatic dispersion compensation on the P transform-domain first real-number signals to obtain the P transform-domain third real-number signals further comprises:

determining 2×m transform-domain third real-number signals that are in the P transform-domain third real-number signals and that are in the first polarization direction based on a transform-domain chromatic dispersion equalization function $I_h(w)$ corresponding to an in-phase real-number signal, a transform-domain chromatic dispersion equalization function $Q_h(w)$ corresponding to a quadrature real-number signal, and an in-phase real-number signal and a quadrature real-number signal that are in the P transform-domain first real-number signals and that are in the first polarization direction; and determining 2×m transform-domain third real-number signals that are in the P transform-domain third real-number signals and that are in the second polarization direction based on $I_h(w)$, $Q_h(w)$, and an in-phase real-number signal and a quadrature real-number signal that are in the P transform-domain first real-number signals and that are in the second polarization direction, wherein $I_h(w)$ and $Q_h(w)$ are obtained by performing NTT processing on a chromatic dispersion impulse response $I_h(t)$ corresponding to the in-phase real-number signal and a chromatic dispersion impulse response $Q_h(t)$ corresponding to the quadrature real-number signal, respectively.

16. The chip according to claim 15, wherein the transform-domain third real-number signals obtained through chromatic dispersion compensation and the transform-domain first real-number signals meet the following requirements:

$$I'_x(w)=I_x(w)\cdot I_h(w)-Q_x(w)\cdot Q_h(w);$$

$$Q'_x(w)=Q_x(w)\cdot I_h(w)+I_x(w)\cdot Q_h(w);$$

$$I'_y(w)=I_y(w)\cdot I_h(w)-Q_y(w)\cdot Q_h(w); \text{ and}$$

$$Q'_y(w)=Q_y(w)\cdot I_h(w)+I_y(w)\cdot Q_h(w), \text{ wherein}$$

$I_x(w)$ represents an in-phase real-number signal that is in the transform-domain first real-number signals and that is in the first polarization direction, $Q_x(w)$ represents a quadrature real-number signal that is in the transform-domain first real-number signals and that is in the first polarization direction, $I_y(w)$ represents an in-phase real-number signal that is in the transform-domain first real-number signals and that is in the second polarization direction, $Q_y(w)$ represents a quadrature real-number signal that is in the transform-domain first real-number signals and that is in the second polarization direction, $I'_x(w)$ represents an in-phase real-number signal that is in the transform-domain third real-number signals and that is in the first polarization direction, $Q'_x(w)$ represents a quadrature real-number signal that is in the transform-domain third real-number signals and that is in the first polarization direction, $I'_y(w)$ represents an in-phase real-number signal that is in the transform-domain third real-number signals and that is in the second polarization direction, and $Q'_y(w)$ represents a quadrature real-number signal that is in the transform-domain third real-number signals and that is in the second polarization direction.

17. The chip according to claim 16, wherein the P input signals comprise P time-domain tenth real-number signals; and wherein the processor is further configured to execute the processor-executable instructions to facilitate:

performing digital back propagation (DBP) processing on P digital signals to obtain the P time-domain tenth real-number signals.

18. The chip according to claim 17, wherein the processor is further configured to execute the processor-executable instructions to facilitate:

performing polarization compensation on the P transform-domain second real-number signals to obtain P transform-domain sixth real-number signals;

performing inverse number theoretic transform (INTT) processing on the P transform-domain sixth real-number signals to obtain P time-domain seventh real-number signals; and combining every two of 2×m time-domain seventh real-number signals that are in the P time-domain seventh real-number signals and that are in the first polarization direction to obtain m time-domain complex-number signals X in the first polarization direction; and combining every two of 2×m time-domain seventh real-number signals that are in the P time-domain seventh real-number signals and that are in the second polarization direction to obtain m time-domain complex-number signals Y in the second polarization direction.

19. The apparatus according to claim 18, wherein the processor is further configured to execute the processor-executable instructions to facilitate:

performing equalization and depolarization on 2×m transform-domain second real-number signals that are in the P transform-domain second real-number signals and that are in the first polarization direction to obtain 2×m transform-domain sixth real-number signals that are in the P transform-domain sixth real-number signals and that are in the first polarization direction; and performing equalization and depolarization on 2×m transform-domain second real-number signals that are in the P transform-domain second real-number signals and that are in the second polarization direction to obtain 2×m transform-domain sixth real-number signals that are in the P transform-domain sixth real-number signals and that are in the second polarization direction.

20. The apparatus according to claim 17, wherein the processor is further configured to execute the processor-executable instructions to facilitate:

performing inverse number theoretic transform (INTT) processing on the P transform-domain second real-number signals to obtain P time-domain eighth real-number signals;

combining every two of 2×m time-domain eighth real-number signals that are in the P time-domain eighth real-number signals and that are in the first polarization direction to obtain m time-domain complex-number signals X in the first polarization direction;

combining every two of 2×m time-domain eighth real-number signals that are in the P time-domain eighth real-number signals and that are in the second polarization direction to obtain m time-domain complex-number signals Y in the second polarization direction; and performing time-domain polarization compensation on the m complex-number signals X and the m complex-number signals Y.

* * * * *

UNITED STATES PATENT AND TRADEMARK OFFICE
CERTIFICATE OF CORRECTION

| | |
|---|---|
| PATENT NO. | : 12,081,275 B2 |
| APPLICATION NO. | : 18/071402 |
| DATED | : September 3, 2024 |
| INVENTOR(S) | : Dolgikh et al. |

Page 1 of 1

It is certified that error appears in the above-identified patent and that said Letters Patent is hereby corrected as shown below:

In the Claims

Claim 5: Column 35, Line 7: "T'$_y$(w) represents an in-phase real-number signal that is in" should read as -- I'$_y$(w) represents an in-phase real-number signal that is in --.

Claim 11: Column 36, Line 40: "A coherent receiver, comprising:" should read as -- A coherent receiver comprising: --.

Claim 11: Column 36, Line 41: "a signal processing apparatus-, a polarization beam split-" should read as -- a signal processing apparatus, a polarization beam split- --.

Claim 12: Column 37, Line 7: "A chip, comprising; a communications interface, a" should read as -- A chip comprising: a communications interface, a --.

Signed and Sealed this
Thirteenth Day of May, 2025

Coke Morgan Stewart
*Acting Director of the United States Patent and Trademark Office*